United States Patent
Maeda et al.

(10) Patent No.: US 8,019,800 B2
(45) Date of Patent: Sep. 13, 2011

(54) ACCESS DEVICE, INFORMATION RECORDING DEVICE, INFORMATION RECORDING SYSTEM, FILE MANAGEMENT METHOD, AND PROGRAM

(75) Inventors: Takuji Maeda, Osaka (JP); Shinji Inoue, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/934,334

(22) PCT Filed: Apr. 1, 2009

(86) PCT No.: PCT/JP2009/001535
§ 371 (c)(1),
(2), (4) Date: Sep. 24, 2010

(87) PCT Pub. No.: WO2009/122743
PCT Pub. Date: Oct. 8, 2009

(65) Prior Publication Data
US 2011/0022645 A1    Jan. 27, 2011

(30) Foreign Application Priority Data
Apr. 4, 2008    (JP) .................... 2008-097724

(51) Int. Cl.
G06F 12/00    (2006.01)
G06F 17/30    (2006.01)
(52) U.S. Cl. .................................................... 707/824
(58) Field of Classification Search .............. None
See application file for complete search history.

(56) References Cited

U.S. PATENT DOCUMENTS

| | | | |
|---|---|---|---|
| 6,138,203 A * | 10/2000 | Inokuchi et al. | 711/103 |
| 6,611,907 B1 | 8/2003 | Maeda et al. | |
| 6,612,490 B1 * | 9/2003 | Herrendoerfer et al. | 235/407 |
| 6,654,772 B1 | 11/2003 | Crow et al. | |
| 6,895,418 B1 | 5/2005 | Crow et al. | |
| 2003/0196027 A1 | 10/2003 | Maeda et al. | |
| 2003/0196028 A1 | 10/2003 | Maeda et al. | |
| 2003/0196064 A1 | 10/2003 | Maeda et al. | |

(Continued)

FOREIGN PATENT DOCUMENTS

JP    2000-148550    5/2000
(Continued)

OTHER PUBLICATIONS

International Search Reprot for corresponding International Application No. PCT/JP2009/001535 mailed May 19, 2009.

(Continued)

*Primary Examiner* — Michael Hicks
(74) *Attorney, Agent, or Firm* — Renner, Otto, Boisselle & Sklar, LLP

(57) ABSTRACT

An information recording device, which includes a nonvolatile memory whose areas are managed using an FAT file system and enhances the reliability of directory entries using a cyclic shift checksum, recalculates the cyclic shift checksum efficiently and performs seeking at a higher speed. A nonvolatile memory (25) of an information recording device 2 is managed using an FAT file system. In the memory, a plurality of directory entries are allocated to a single file. The device enhances the reliability of the directory entries using a cyclic shift checksum, and manages information indicating the position and the size of a storage area of file data using an extent information entry (203). The device further uses an update information entry (204) and a dummy entry (205).

13 Claims, 18 Drawing Sheets

U.S. PATENT DOCUMENTS

| | | |
|---|---|---|
| 2003/0200411 A1 | 10/2003 | Maeda et al. |
| 2004/0105332 A1 | 6/2004 | Crow et al. |
| 2004/0254907 A1 | 12/2004 | Crow et al. |
| 2005/0013583 A1 | 1/2005 | Itoh |
| 2005/0060513 A1 | 3/2005 | Maeda et al. |
| 2005/0152251 A1 | 7/2005 | Harumatsu |
| 2006/0136529 A1 | 6/2006 | Pudipeddi et al. |
| 2007/0028153 A1 | 2/2007 | Gotoh et al. |
| 2007/0094315 A1 | 4/2007 | Seo et al. |
| 2008/0091702 A1 | 4/2008 | Pudipeddi et al. |
| 2008/0168029 A1 | 7/2008 | Pudipeddi et al. |
| 2008/0215646 A1 | 9/2008 | Pudipeddi et al. |
| 2008/0215647 A1 | 9/2008 | Pudipeddi et al. |
| 2009/0265400 A1 | 10/2009 | Pudipeddi et al. |
| 2011/0060775 A1 * | 3/2011 | Fitzgerald, Richard ...... 707/824 |

FOREIGN PATENT DOCUMENTS

| | | |
|---|---|---|
| JP | 2000-200207 | 7/2000 |
| JP | 2000-353115 A | 12/2000 |
| JP | 2001-188701 A | 7/2001 |
| JP | 2004-192661 | 7/2004 |
| JP | 2005-222483 | 8/2005 |
| JP | 2005-222525 | 8/2005 |
| JP | 2006-172485 | 6/2006 |
| JP | 2006-178632 | 7/2006 |
| JP | 2007-265010 | 10/2007 |
| WO | 2004/109691 A1 | 12/2004 |

OTHER PUBLICATIONS

Japanese Office Action for corresponding Japanese Application No. 2010-505400 issued Nov. 9, 2010.

* cited by examiner

Basic entry ~ 201

| Offset | Size | Name |
|---|---|---|
| 0 | 1 | Type (including flag indicating occupied status) |
| 1 | 1 | Secondary entry number |
| 2 | 2 | Checksum |
| 4 | 2 | Attribute |
| 6 | 12 | Timestamp |
| 18 | 1 | Time zone |
| 19 | 1 | Reserved (0x00) |
| 20 | 4 | First cluster number |
| 24 | 8 | File size |

FIG. 6

Name entry ~ 202

| Offset | Size | Name |
|---|---|---|
| 0 | 1 | Type (including flag indicating occupied status) |
| 1 | 1 | File name length |
| 2 | 2 | Name hash |
| 4 | 28 | File name |

FIG. 7

Extent information entry ~ 203

| Offset | Size | Name |
|---|---|---|
| 0 | 1 | Type (including flag indicating occupied status) |
| 1 | 19 | Reserved (0x00) |
| 20 | 4 | First cluster number |
| 24 | 8 | Continuous area size |

FIG. 8

Update information entry ~ 204

| Offset | Size | Name |
|---|---|---|
| 0 | 1 | Type (including flag indicating occupied status) |
| 1 | 1 | Reserved (0x00) |
| 2 | 12 | Timestamp |
| 14 | 1 | Time zone |
| 15 | 9 | Reserved (0x00) |
| 24 | 8 | File size |

FIG. 9

Dummy entry ~205

| Offset | Size | Name |
|---|---|---|
| 0 | 1 | Type (including flag indicating occupied status) |
| 1 | 31 | 0x00 padding |

Connection entry ~206

| Offset | Size | Name |
|---|---|---|
| 0 | 1 | Type (including flag indicating occupied status) |
| 1 | 1 | Secondary entry number |
| 2 | 2 | Checksum |
| 4 | 28 | 0x00 padding |

FIG. 15

Extent area designation entry ~ 207

| Offset | Size | Name |
|---|---|---|
| 0 | 1 | Type (including flag indicating occupied status) |
| 1 | 19 | Reserved (0x00) |
| 20 | 4 | First cluster number |
| 24 | 8 | Extent area size |

FIG. 18

ACCESS DEVICE, INFORMATION RECORDING DEVICE, INFORMATION RECORDING SYSTEM, FILE MANAGEMENT METHOD, AND PROGRAM

TECHNICAL FIELD

The present invention relates to an access module (access device), an information recording module (information recording device), an information recording system, a file management method, and a program for storing data into a nonvolatile memory and managing the data as files.

BACKGROUND ART

A variety of media are used to store digital data such as music content and image data. Examples include magnetic disks, optical discs, and magneto-optical disks. Among such recording media, memory cards that use semiconductor memories including flash ROMs as their recording elements are compact, and thus have become rapidly widespread mainly in compact portable devices, such as digital still cameras and mobile telephone terminals. In particular, semiconductor memories, which have conventionally been used as removable media like memory cards, have recently found application as built-in memories. For example, semiconductor memories, such as flash ROMs, are built in devices and used in place of hard disks.

A memory card and a built-in memory mainly use a semiconductor device called a NAND-type flash memory, which is a recording element on which recorded data can be erased and new data can be recorded. Like a conventional hard disk, the NAND-type flash memory can be used to form an information recording device that is rewritable a plurality of number of times.

A conventional way to manage data stored in a memory card or a built-in memory uses a file system. Data managed using a file system can be shared as files between a plurality of devices that can interpret the same file system. Such file system management enables a user to easily refer to or copy his or her stored data on a plurality of devices.

A file system that has conventionally achieved most widespread use is a file allocation table (FAT) file system. The FAT file system manages areas in a unified manner using a file allocation table (FAT). With its simple structure and easy implementation, the FAT file system is used in many recording media, such as flexible disks, hard disks of personal computers, and memory cards.

FIG. 2 shows the structure of the FAT file system.

The FAT file system can be of one of a plurality of types: FAT12, FAT16, and FAT32, which differ from one another in the bit width of the management unit used in their file allocation table. The FAT file system of any of these types uses substantially the same method for managing areas using the file allocation table. In this example, the FAT16 file system will be described.

As shown in FIG. 2, at the beginning of the logical address space is a file system management information area 301, which stores management information for the file system, such as information indicating the unit of area allocation and the size of areas that are managed by the file system.

The file system management information area 301 stores a plurality of sets of management information: a master boot record (MBR) partition table 303, a partition boot sector 304, FATs (305 and 306), and a root directory entry 307, each of which stores information required to manage a user data area 302.

The MBR partition table 303 stores information used to manage areas of the logical address space managed by the file system by dividing the logical address space into a plurality of areas called partitions.

The partition boot sector 304 stores information about management within each partition, such as information about the unit of area management within the partition.

The FATs (305 and 306) each stores information about the storage position of file data. The FAT file system usually has two FATs (305 and 306) each storing the same information. Even if one FAT (305 or 306) is corrupted, the duplicated feature of the FAT file system enables access to files by using the other FAT (305 or 306).

The root directory entry 307 stores information about files and directories (directory entries) that are immediately below the root directory.

The FAT file system further includes the user data area 302, which is preceded by the file system management information area 301. The user data area 302 stores main data stored in a file and the like.

The user data area 302 is managed in units of divided areas called clusters, each of which has a size of 512 bytes to tens of kilobytes. Each cluster stores data stored in a file. A file storing a large amount of data uses a plurality of clusters to store the data. The FATs (305 and 306) store link information that is used to manage links between such clusters.

Also, a part of the user data area 302 is used to store information about files and sub-directories (directory entries) immediately below the root directory.

FIG. 3 shows the structure of a directory entry of the FAT16 file system.

A directory entry 308, which has 32 bytes, is allocated to each file or each directory, and stores information associated with the file or the directory. More specifically, information representing the 32-byte directory entry 308 is newly generated every time when a file or a directory is added, and is stored into the area of the root directory entry 307 or into the user data area 302.

The first eight-byte of the directory entry 308 stores a file name or a directory name.

The following three-byte stores an extension.

The following one-byte stores attribute information, such as a flag indicating a type either being a file or a directory, and a flag indicating whether the file or the directory is read-only.

The directory entry 308 may further store information about the last update time and date of the file or the directory, a first cluster number indicating the position of a first cluster among a plurality of clusters storing the file data or the directory data, and a file size indicating the number of bytes of the file.

As described above, the directory entry 308 only stores information indicating the position of the first single cluster storing the file data or the directory data. The positions of data stored in the second and subsequent clusters are managed by the FATs (305 and 306) when the file data or the directory data is larger than the size of one cluster.

FIG. 4 shows the structure of the FAT (305, 306) used in the FAT16 file system.

In the FAT16 file system, the FAT (305, 306) manages 2-byte (16-bit) information as a single FAT entry. A single FAT entry indicates the status of its corresponding single cluster. More specifically, when the user data area 302 includes M clusters, the FAT includes M FAT entries. In this case, the FAT (305, 306) has a size of about 2*M bytes. The first two FAT entries of the FAT store, as a signature, fixed values (0xF8FF, 0xFFFF) indicating the beginning of the FAT. The fourth and fifth bytes of the FAT (305, 306) store an FAT entry corresponding to the first cluster included in the user data area 302. When the four-byte signature stored at the beginning of the FAT is assumed to be the 0-th and $1^{st}$ FAT entries, the fourth and fifth bytes are the two bytes storing the second FAT entry. As a result, a cluster number of 2 is assigned to the first cluster included in the user data area 302 for convenience. The FAT includes no clusters with cluster numbers of 0 or 1.

Each FAT entry further indicates the status of the corresponding cluster (occupied, unoccupied, or defective) and a cluster number of a linked cluster. In FIG. 4, for example, an FAT entry with an assigned cluster number of 2 is set as 0x0003 ("3" when expressed as a decimal number), indicating that data subsequent to the data stored in the cluster with the cluster number of 2 is stored in a cluster with a cluster number of 3. In the same manner, an FAT entry with an assigned cluster number of 3 is set as 0x0004 ("4" when expressed as a decimal number), indicating that data subsequent to the data stored in the cluster with the cluster number of 3 is stored in a cluster with a cluster number of 4. An FAT entry with an assigned cluster number of 6 is set as 0xFFFF, indicating that no cluster is linked to this cluster, and this cluster is the end of the link. In the example shown in FIG. 4, the file data is stored over a plurality of clusters in the order of the cluster numbers of 2, 3, 4, 5, and 6.

Also, an FAT entry with an assigned cluster number of 7 is set as 0x0000, indicating that the corresponding cluster is not used and is in an unoccupied state.

An FAT entry with an assigned cluster number of (M+1) is set as 0xFFF7, indicating that the corresponding cluster is in a defective state, or that the corresponding cluster is for example physically damaged and data cannot be recorded into this cluster.

To sum up, the three FAT entry values 0x0000, 0xFFFF, and 0xFFF7 have different distinct meanings. The FAT entry values from 0x0002 to 0xFFF6 are used as cluster numbers of linked clusters. The other values, that is, the values 0x0001 and 0xFFF8 to 0xFFFE, are reserved and are not used normally.

As described above, when file data is stored over a plurality of clusters under the FAT file system, links between the clusters are stored and managed using the values of FAT entries. To read the file data sequentially from the beginning to the end, the FAT (305, 306) is to be referred to and a cluster number of the next linked cluster is to be identified every time when the data reading position reaches a boundary between clusters.

In the same manner, when an information recording system using the FAT file system reads data at a selected position within a file through seeking, the system needs to refer to the FAT (305, 306) and identify a cluster number of a cluster storing the data to be read, and follow links of clusters corresponding to the seek size. The processing time required for such seeking will be longer as the file size increases. A file having 1 GB is assumed to be managed in units of clusters each having 16 KB. In this case, the information recording system needs to follow about 65,000 links. A relatively low-speed CPU would require a processing time of as long as several seconds for such seeking. Further, the FAT (305, 306) stores link information indicating links only in the forward direction of the file. To seek in the reverse direction of the file, the information recording system needs to seek again from the beginning of the file. This prevents seeking to be performed at a high speed.

With a conventional method that can solve this problem, information about a position of a file data storage area is stored at a position immediately following a directory entry 308 of the file (see, for example, Patent Citation 1).

With this method, the directory entry 308 of the file is arranged at the beginning position of a selected cluster included in a directory area, and erased directory entries are arranged in all the other areas of the selected cluster.

Further, a plurality of pieces of logical block addressing (LBA) access information indicating start positions and end positions of areas storing the file data are stored into the erased directory entries.

The LBA access information allows seeking in a file to be performed simply by referring to the LBA access information, without requiring to refer to the FAT. This enables the seeking to be performed at a higher speed.

However, this method uses the erased directory entries to store the LBA access information. When a file or a directory is created by a device that interprets only the conventional FAT file system that is not designed to process the LBA access information, the device may erroneously use an erased directory entry storing the LBA access information and corrupt the LBA access information.

The FAT file system uses the directory entry 308 having the structure shown in FIG. 3, in which a reserved field is actually used to store, for example, information about a timestamp. In this case, the directory entry 308 lacks a sufficient amount of reserved field. As a result, the FAT file system lacks extensibility. A conventional method that can solve this problem uses an extensible file system format (see, for example, Patent Citation 2).

With this conventional method, the first 1-byte of each directory entry is used as a "type" field, which stores the type of the directory entry. This field is used to define the directory entry type, such as a primary directory entry or a second directory entry, and increases the extensibility of the file system.

The above two techniques may be combined. More specifically, the type of the directory entry may define a special directory entry storing information about a position of a file data storage area, which may then be stored as additional information of the directory entry for the file. This structure prevents a conventional device that cannot interpret the special directory entry from corrupting the information indicating a position of a file data storage area.

In this case, a plurality of directory entries are allocated to a single file. This structure further requires a mechanism for ensuring consistency between directory entries and enhancing the reliability of the directory entries. One such mechanism may use a cyclic shift checksum, which is implemented, for example, as a "sum" command in a Unix (registered trademark) operating system.

FIG. 5 is a flowchart showing a process for calculating a cyclic shift checksum.

The cyclic shift checksum is calculated not only by simply adding calculation target data but also by cyclically shifting the value by a single bit every time when adding data. Such cyclic shift allows an error to be detected even when the sequence of the calculation target data is changed, thereby enhances reliability.

The cyclic shift checksum is calculated using all directory entry areas allocated to a single file as the calculation target data, and the calculated cyclic shift checksum is then stored into a specific field of each directory entry. This allows corruption of any directory entry to be detected, thereby enhances reliability.

Patent Citation 1: Japanese Unexamined Patent Publication No. 2006-178632

Patent Citation 2: Japanese Unexamined Patent Publication No. 2006-172485

DISCLOSURE OF INVENTION

Technical Problem

However, the above technique has the problems described below.

The above method requires information indicating a position of a file data storage area to be added every time when data is additionally recorded into the file and a file data storage area is added.

The above method further requires information that would change when data is additionally recorded into the file, such as information about the file size and the timestamp, to be updated every time when data is additionally recorded into the file. The information is stored in the plurality of directory entries that are allocated to the single file. When the above cyclic shift checksum, which depends on the sequence of data, is included in the directory entries, the checksum needs to be recalculated by newly referring to all the calculation target data every time when even a single byte of the information changes.

In particular, when the file size increases and information indicating positions of file data storage areas increases, the amount of data to be referred to when the checksum is recalculated will increase, and the overhead for the checksum recalculation processing will increase accordingly.

To solve the above problems, it is an object of the present invention to provide an access module, an information recording module, and an information recording system that enable a cyclic shift checksum, which is used to enhance the reliability of directory entries, to be recalculated efficiently, and enable seeking, which can be a weakness of an FAT file system, to be performed at a higher speed.

Technical Solution

A first aspect of the present invention provides an access device that accesses an information recording device including a nonvolatile memory storing file data. The access device includes a file system control unit that manages a file using an extent information entry, a file allocation table, and an entry group.

The extent information entry manages the file data in units of fixed-length blocks, and includes, as management information for a continuous area including one or more fixed-length blocks, information for identifying at least a position and a size of the continuous area. The file allocation table manages information indicating a link between the fixed-length blocks. The entry group is generated for each file, and internally includes one or more fixed-length entries storing management information including information about a name and a size of the file and information about a checksum of the one or more fixed-length entries.

The file system control unit stores the extent information entry into an external area consisted of the fixed-length blocks, each of which has a predetermined length, the external area being external to the area of the entry group.

In this access device, the file system control unit manages files using both the extent information entry and the file allocation table (FAT).

As a result, this access device manages, for example, files having a large size (extensible files) that are managed using an extent information entry and other normal files efficiently. The access device, which manages files using an extent information entry, enables seeking, which can be a weakness of an FAT file system, to be performed at a higher speed.

Further, this access device uses the entry group including information about a checksum for the entry group corresponding to the file, and thus detects inconsistency between entries. This enhances the reliability of a file system that is used by the access device.

Further, the file system control unit of this access device stores an extent information entry into an extent area that is external to an entry group and is formed by a fixed-length block. This prevents the size of the entry group from increasing even when a processing target file has a large size. As a result, the checksum calculation process (arithmetic processing) is performed at a higher speed.

The access device may be an access module.

A second aspect of the present invention provides the access device of the first aspect of the present invention in which the entry group includes an extent area designation entry including information for identifying a position and a size of the extent area.

This access device manages (accesses), for example, files having a large size (extensible files) that include an extent area designation entry and that are managed using an extent information entry and normal files that include no extent area designation entry (files other than extensible files) efficiently.

A third aspect of the present invention provides the access device of the second aspect of the present invention in which the file system control unit adds an extent area extent information entry including information for identifying a position and a size of a continuous area every time when an independent continuous area storing data of the file increases.

A fourth aspect of the present invention provides the access device of the third aspect of the present invention in which a byte length of the extent area extent information entry is identical to a byte length of an entry included in the entry group.

A fifth aspect of the present invention provides the access device of the third aspect of the present invention in which a byte length of the extent area extent information entry is different from a byte length of an entry included in the entry group.

A sixth aspect of the present invention provides the access device of any one of the first to fifth aspects of the present invention in which the information about the checksum includes a calculation result of a cyclic shift checksum.

A seventh aspect of the present invention provides the access device of any one of the first to sixth aspects of the present invention in which the access device includes an extensible file processing unit and a normal file processing unit.

The extensible file processing unit accesses a file by controlling access to the file based on the extent area designation entry and the extent area extent information entry when the entry group corresponding to the file includes the extent area designation entry.

The normal file processing unit accesses a file by controlling access to the file based on the file allocation table when the entry group corresponding to the file includes no extent area designation entry.

An eighth aspect of the present invention provides an information recording device including a nonvolatile memory storing file data. The nonvolatile memory stores an extent information entry, a file allocation table, and an entry group.

The file data is managed in units of fixed-length blocks.

The extent information entry includes, as management information for a continuous area including one or more fixed-length blocks, information for identifying at least a position and a size of the continuous area. The file allocation table manages information indicating a link between the fixed-length blocks. The entry group is generated for a single file, and internally includes one or more fixed-length entries storing management information including information about a name and a size of the file and information about a checksum of the one or more fixed-length entries.

The extent information entry is stored into an area that is external to the entry group and is included in an extent area formed by a fixed-length block.

This information recording device is, for example, controlled by an access device, to manage files using both the extent information entry and the file allocation table (FAT).

As a result, this information recording device manages, for example, files having a large size (extensible files) that are managed using an extent information entry and other normal files efficiently. The information recording device enables files to be managed using an extent information entry, and enables seeking, which can be a weakness of an FAT file system, to be performed at a higher speed.

Further, this information recording device uses the entry group including information about a checksum for the entry group corresponding to the file, and thus detects inconsistency between entries. This enhances the reliability of a file system that is used by the information recording device.

Further, the information recording device stores an extent information entry into an extent area that is external to an entry group and is formed by a fixed-length block. This prevents the size of the entry group from increasing even when a processing target file has a large size. As a result, the checksum calculation process (arithmetic processing) is performed at a higher speed.

The information recording device may be an information recording module.

A ninth aspect of the present invention provides the information recording device of the eighth aspect of the present invention in which the entry group includes an extent area designation entry including information for identifying a position and a size of the extent area.

A tenth aspect of the present invention provides the information recording device of the ninth aspect of the present invention in which an extent area extent information entry including information for identifying a position and a size of a continuous area is added to the extent area every time when an independent continuous area storing data of the file increases.

An eleventh aspect of the present invention provides the information recording device of the tenth aspect of the present invention in which a byte length of the extent area extent information entry is identical to a byte length of an entry included in the entry group.

A twelfth aspect of the present invention provides the information recording device of the tenth aspect of the present invention in which a byte length of the extent area extent information entry is different from a byte length of an entry included in the entry group.

A thirteenth aspect of the present invention provides the information recording device of one of the eighth to twelfth aspects of the present invention in which the information about the checksum includes a calculation result of a cyclic shift checksum.

A fourteenth aspect of the present invention provides an information recording system including an information recording device including a nonvolatile memory storing file data and an access device that accesses the information recording device.

The file data is managed in units of fixed-length blocks. The nonvolatile memory stores an extent information entry, a file allocation table, and an entry group.

The extent information entry includes, as management information for a continuous area including one or more fixed-length blocks, information for identifying at least a position and a size of the continuous area. The file allocation table manages information indicating a link between the fixed-length blocks. The entry group is generated for a single file, and internally includes one or more fixed-length entries storing management information including information about a name and a size of the file and information about a checksum of the one or more fixed-length entries.

The access device includes a file system control unit that manages a file stored in the nonvolatile memory using information stored in the nonvolatile memory.

The extent information entry is stored into an area that is external to the entry group and is included in an extent area formed by a fixed-length block.

In this information recording system, the file system control unit manages files using both the extent information entry and the file allocation table (FAT).

As a result, this information recording system manages, for example, files having a large size (extensible files) that are managed using an extent information entry and other normal files efficiently. The information recording system, which manages files using an extent information entry, enables seeking, which can be a weakness of an FAT file system, to be performed at a higher speed.

Further, this information recording system uses the entry group including information about a checksum for the entry group corresponding to the file, and thus detects inconsistency between entries. This enhances the reliability of a file system that is used by the access device.

Further, the information recording system stores an extent information entry into an extent area that is external to an entry group and is formed by a fixed-length block. This prevents the size of the entry group from increasing even when a processing target file has a large size. As a result, the checksum calculation process (arithmetic processing) is performed at a higher speed.

A fifteenth aspect of the present invention provides an information recording system including the access device according to any one of the first to seventh aspects of the present invention, and the information recording device according to any one of the eighth to thirteenth aspects of the present invention.

A sixteenth aspect of the present invention provides a file management method using a nonvolatile memory storing file data. The method includes managing a file using an extent information entry, a file allocation table, and an entry group.

The extent information entry is an extent information entry for managing the file data in units of fixed-length blocks, and including, as management information for a continuous area including one or more fixed-length blocks, information for identifying at least a position and a size of the continuous area. The file allocation table manages information indicating a link between the fixed-length blocks. The entry group is generated for a single file, and internally includes one or more fixed-length entries storing management information including information about a name and a size of the file and information about a checksum of the one or more fixed-length entries.

The extent information entry is stored into an area that is external to the entry group and is included in an extent area formed by a fixed-length block.

With this file management method, files are managed using both the extent information entry and the file allocation table (FAT).

As a result, with this file management method, for example, files having a large size (extensible files) that are managed using an extent information entry and other normal files are managed efficiently. This file management method, with which files are managed using an extent information entry, enables seeking, which can be a weakness of an FAT file system, to be performed at a higher speed.

Further, this file management method uses the entry group including information about a checksum for the entry group corresponding to the file, and thus enables inconsistency between entries to be detected. This enhances the reliability of a file system that is processed with the file management method.

Further, with this file management method, an extent information entry is stored into an extent area that is external to an entry group and is formed by a fixed-length block. This prevents the size of the entry group from increasing even when a processing target file has a large size. As a result, the checksum calculation process (arithmetic processing) is performed at a higher speed.

A seventeenth aspect of the present invention provides a program enabling a computer to implement the file management method of the sixteenth aspect of the present invention.

This program has the same advantageous effects as the file management method of the sixteenth aspect of the present invention.

Advantageous Effects

The present invention enables a cyclic shift checksum, which is used to enhance the reliability of directory entries, to be recalculated efficiently, and enables seeking, which can be a weakness of an FAT file system, to be performed at a higher speed.

BRIEF DESCRIPTION OF DRAWINGS

FIG. 6 is a schematic diagram showing the structure of a basic entry in the first embodiment.

FIG. 7 is a schematic diagram showing the structure of a name entry in the first embodiment.

FIG. 8 is a schematic diagram showing the structure of an extent information entry in the first embodiment.

FIG. 9 is a schematic diagram showing the structure of an update information entry in the first embodiment.

FIG. 10 is a schematic diagram showing the structure of a dummy entry in the first embodiment.

FIG. 15 is a schematic diagram showing the structure of a connection entry in the first embodiment.

FIG. 18 is a schematic diagram showing the structure of an extent area designation entry in the second embodiment.

EXPLANATION OF REFERENCE

Figure 1:
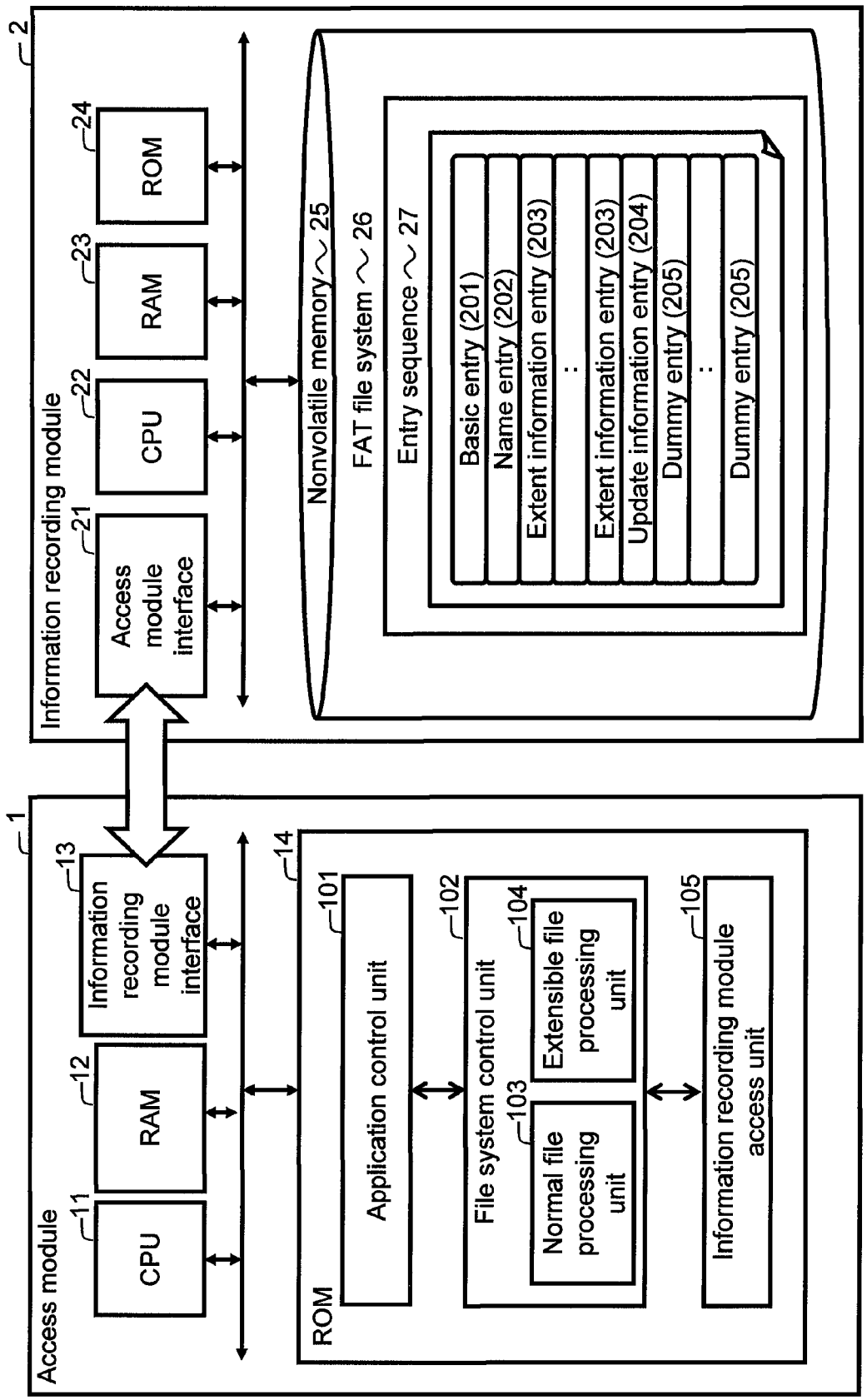
FIG. 1 is a schematic diagram showing the structure of an access module and an information recording module according to a first embodiment of the present invention.

1000, 2000 information recording system
1 access module
2 information recording module
11, 22 CPU
12, 23 RAM
13 information recording module interface
14, 24 ROM
21 access module interface
25 nonvolatile memory
26 FAT file system
27 entry sequence
28 extent area
101 application control unit
102 file system control unit
103 normal file processing unit
104 extensible file processing unit
105 information recording module access unit
201 basic entry
202 name entry
203 extent information entry
204 update information entry
205 dummy entry
206 connection entry
207 extent area designation entry
301 file system management information area
302 user data area
303 MBR partition table
304 partition boot sector
305, 306 FAT
307 root directory entry
308 directory entry

BEST MODE FOR CARRYING OUT THE INVENTION

An access module, an information recording module, and an information recording system of the present invention will now be described with reference to the drawings.

First Embodiment

FIG. 1 shows the structure of an information recording system 1000 according to a first embodiment of the present invention. As shown in FIG. 1, the information recording system 1000 includes an access module 1 and an information recording module 2.

1.1 Structure of Access Module

As shown in FIG. 1, the access module 1 includes a CPU 11, a RAM 12, an information recording module interface 13, and a ROM 14.

The ROM 14 stores a program used to control the access module 1. The program is executed by the CPU 11 using the RAM 12 as a temporary storage area.

The information recording module interface 13 functions as a connection unit for connecting the information recoding module 2 and the access module 1. The information recording module interface 13 transmits and receives control signals and data between the modules.

The ROM 14 further includes an application control unit 101, a file system control unit 102, and an information recording module access unit 105.

The application control unit 101 executes control over the entire access module 1, such as the control associated with data generation and power supply.

The file system control unit 102 executes control associated with management of data as files through a file system.

The information recording module access unit 105 controls transmission and reception of commands and data to and from the information recording module 2. For example, the information recording module access unit 105 receives data together with an associated information of its size and address from the file system control unit 102, and sends commands and/or data for recording data with the designated size at the designated position in a recording area of the information recording module 2.

The file system control unit 102 further includes a normal file processing unit 103 and an extensible file processing unit 104.

The normal file processing unit 103 performs processing to access a file having a relatively small size whose areas are managed using the FAT (305, 306).

The extensible file processing unit 104 is unique to the present invention, and performs processing to access a file having a relatively large size whose areas are managed using an extent information entry 203 defined according to the present invention.

1.2 Structure of Information Recording Module

In FIG. 1, the information recording module 2 includes an access module interface 21, a CPU 22, a RAM 23, a ROM 24, and a nonvolatile memory 25.

The access module interface 21 functions as a connection unit for connecting the information recoding module 2 and the access module 1. Like the information recording module interface 13, the access module interface 21 transmits and receives control signals and data between the modules.

The ROM 24 stores a program used to control the information recording module 2. The program is executed by the CPU 22 using the RAM 23 as a temporary storage area.

Figure 2:
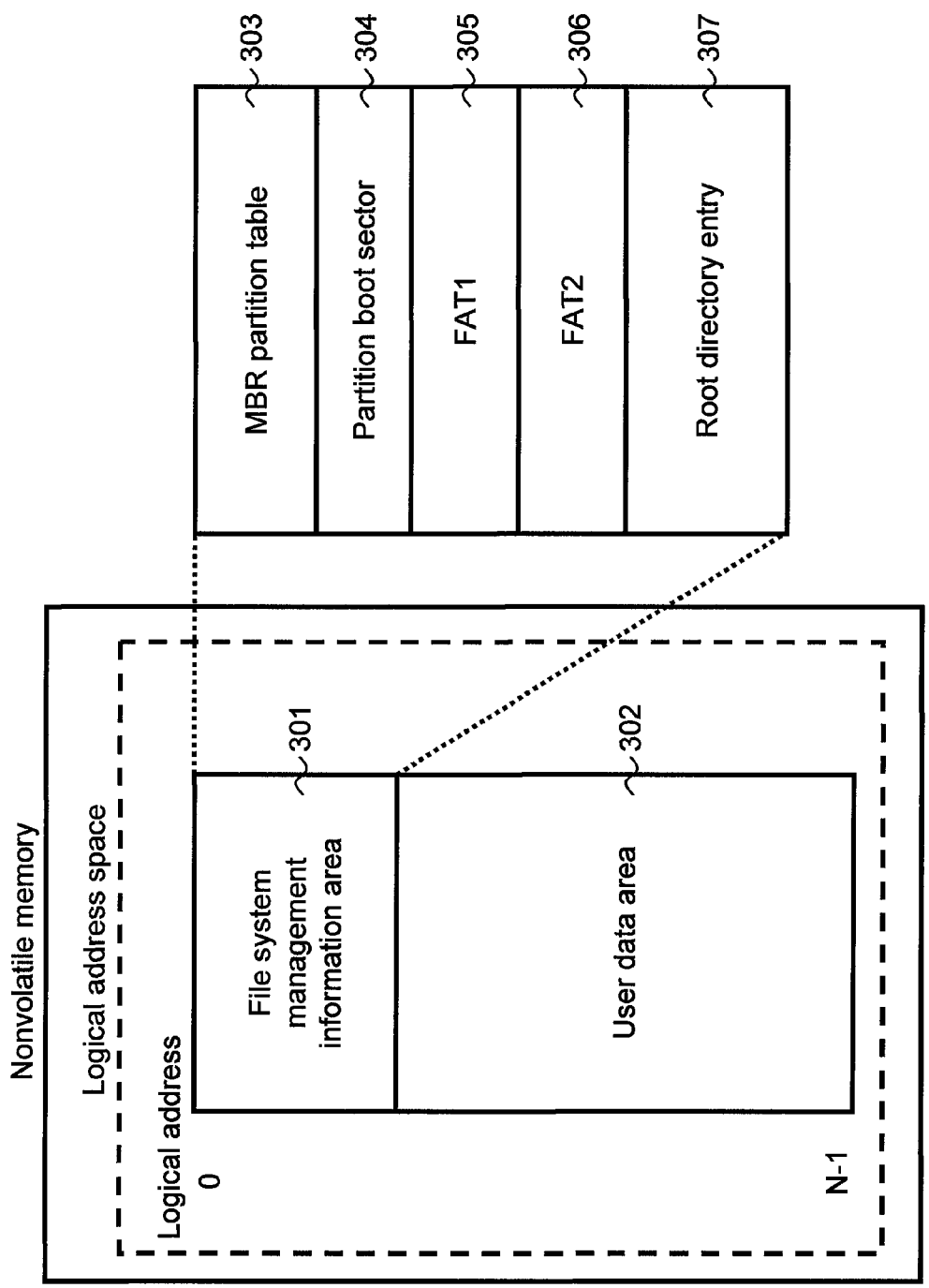
FIG. 2 is a schematic diagram showing the structure of an FAT file system.
Figure 3:
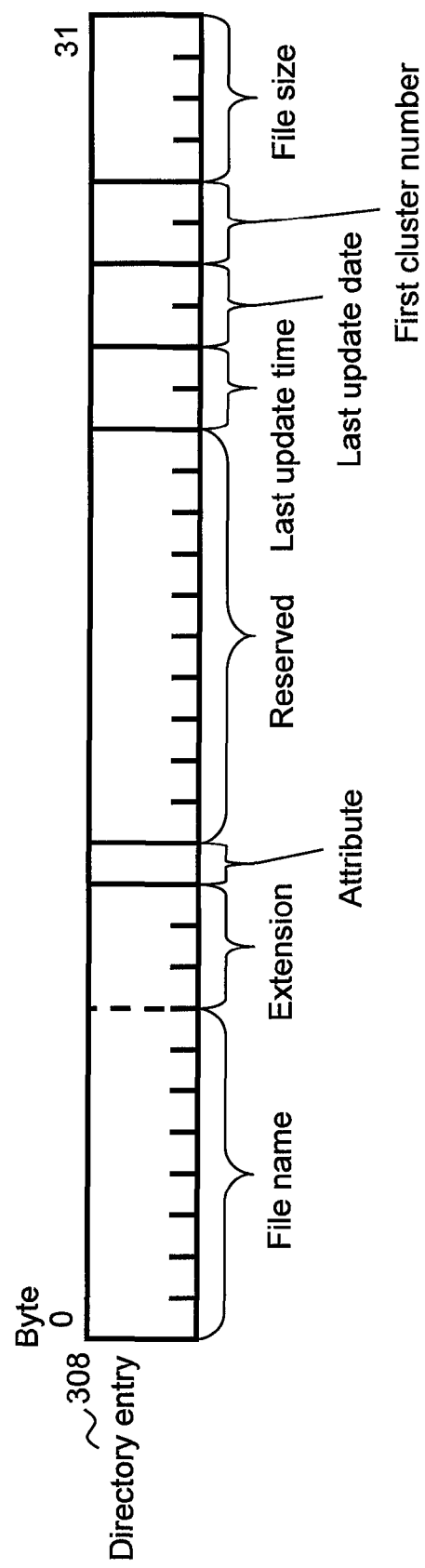
FIG. 3 is a schematic diagram showing the structure of a directory entry.
Figure 4:
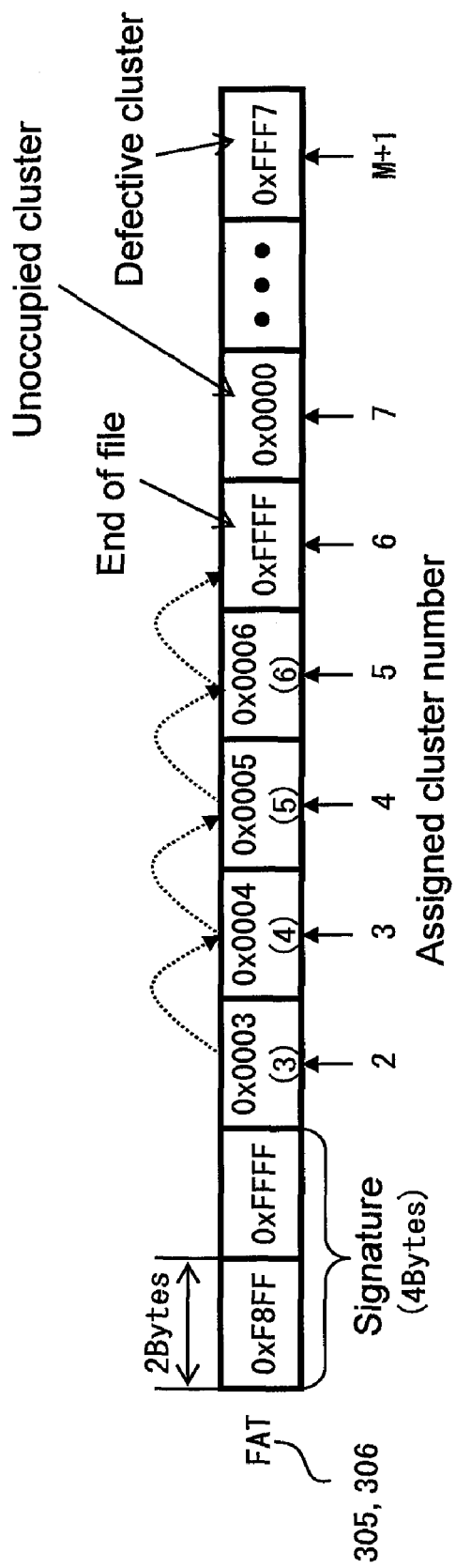
FIG. 4 is a schematic diagram showing one example of an FAT.

The nonvolatile memory 25 stores data transmitted from the access module 1. The data recorded, read, or stored in the nonvolatile memory 25 is managed using an FAT file system 26. In other words, the logical address space of the nonvolatile memory 25 for example has the structure shown in FIG. 2 managed using the FAT file system 26. The data recorded (written), reproduced (read), or stored in the nonvolatile memory 25 for example has the structure shown in FIG. 2 that is defined by the FAT file system 26. More specifically, the recording area of the nonvolatile memory 25 is divided in units of clusters, and is managed using the FAT (305, 306). Information about the name or the size of a file or a directory is managed using a directory entry.

The present invention assumes that various types of directory entries can be defined using the "type" field of each directory entry in the same manner as the extensible file system described in Patent Citation 2. Also, the present invention allocates a plurality of directory entries to a single file such that the information about such file is stored in multiple directory entries.

The present invention refers to the group of directory entries as an entry sequence 27.

1.2.1 Entry Sequence

FIG. 1 shows an example of the entry sequence 27 stored in the nonvolatile memory 25.

As shown in FIG. 1, the entry sequence 27 includes a basic entry 201, a name entry 202, an extent information entry 203, an update information entry 204, and dummy entries 205.

Each of the entries will be described in detail later. The information recording system 1000 uses the entry sequence including at least one extent information entry 203 including information about the position and the size of a file data storage area. This enables seeking to be performed at a higher speed.

Further, the information recording system 1000 uses the entry sequence including the update information entry 204 and the dummy entries 205. This enables a cyclic shift checksum to be calculated at a high speed.

In the information recording system 1000, the extensible file processing unit 104 manages files using the extent information entry 203, the update information entry 204, and the dummy entries 205. As a result, the information recording system 1000, which uses the cyclic shift checksum to enhance the reliability of directory entries, recalculates the cyclic shift checksum efficiently, and enables seeking, which can be a weakness of the FAT file system, to be performed at a higher speed.

1.2.2 Details of Directory Entries

The directory entries used in the first embodiment will now be described in detail. In the first embodiment of the present invention, the directory entries are all assumed to have a fixed length of 32 bytes.

Each directory entry has a "type" field at its first byte. The type of each directory entry is defined using the value set in the "type" filed.

The present embodiment (the information recording system 1000) uses directory entries of five types:
  (1) a basic entry 201,
  (2) a name entry 202,
  (3) an extent information entry 203,
  (4) an update information entry 204, and
  (5) a dummy entry 205.

Each of the above five types of directory entries will now be described with references to FIGS. 6 to 10. In the tables shown in FIGS. 6 to 10, values in an "offset" column and a "size" column are in units of bytes. The directory entries of the above five types each has a fixed length of 32 bytes.

(1) Basic Entry 201

FIG. 6 shows the structure of a basic entry 201.

The basic entry 201 is a directory entry for storing basic information about a file. The entry sequence 27 allocated to each file always includes a single basic entry 201.

The "type" field stores a fixed value indicating that this entry is a basic entry 201.

The "secondary entry number" field stores the number of secondary entries that follow the basic entry 201. When, for example, the "secondary entry number" field stores 10, the entry sequence 27 allocated to this file consists of 11 directory entries including the basic entry.

The "checksum" field stores a cyclic shift checksum value calculated for the entry sequence 27. This field allows inconsistency between directory entries to be detected even when a plurality of directory entries are allocated to a single file, thereby enhances the reliability of the file system.

For example, in an extensible FAT file system in which a plurality of directory entries are allocated to a single file, data stored in the plurality of directory entries may occupy two sectors (or two clusters) of the nonvolatile memory 25 (data may be at a boundary between sectors (or data may be at a boundary between clusters)). The processing for writing the data of the plurality of directory entries into the nonvolatile memory 25 can be interrupted due to power shutdown, etc., while the data has been completely written into one sector (or cluster) but has yet to be written completely into the other sector (or cluster). When this happens, the data stored in the directory entries will be inconsistent between the directory entries. The checksum stored in the "checksum" field can be used to detect such inconsistency between the directory entries, thereby enhances the reliability of the file system.

When calculating the cyclic shift checksum, this field (the "checksum" field) is excluded from the target being calculated.

The "attribute" field stores a value indicating a file attribute, such as the read-only attribute or the system file attribute.

The "timestamp" field stores a value indicating a timestamp, such as the time and date when the file is created or the time and date when the file is updated.

The "time zone" field stores a value indicating a time zone in which the timestamp is set.

The "reserved" field is reserved for future extensibility. This field normally stores a value of 0x00.

The "first cluster number" field stores a value indicating a cluster number of a first cluster that is arranged at the beginning of an area storing the file data.

The "file size" field stores a value indicating the size of the file.

(2) Name Entry 202

FIG. 7 shows the structure of a name entry 202.

The name entry 202 is a directory entry for storing the name of a file. Like the basic entry 201, the entry sequence 27 allocated to each file always includes a single name entry 202.

The "type" fields stores a fixed value indicating that this entry is a name entry 202.

The "file name length" field stores a value indicating the length of the file name.

The "name hash" field stores a hash value of the file name.

The "file name" field stores the name of the file.

(3) Extent Information Entry 203

FIG. 8 shows the structure of an extent information entry 203.

The extent information entry 203 is a directory entry for storing information indicating the position and the size of a file data storage area. The entry sequence 27 may or may not include this field depending on the file.

A single extent information entry 203 stores information about a single continuous area. When the file consists of a plurality of continuous areas, the entry sequence 27 includes a plurality of extent information entries 203. An extent information entry 203 includes information indicating the position and the size of a corresponding continuous area. Even a large continuous area can be managed using the directory entry having a fixed length of 32 bytes. Seeking in a file can be performed by referring to the extent information entries 203 instead of referring to the FAT (305, 306). This enables the seeking to be performed at a higher speed.

The "type" field stores a fixed value indicating that this entry is an extent information entry 203.

The "reserved" field is reserved for future extensibility. This field normally stores a value of 0x00.

The "first cluster number" field stores a cluster number of a first cluster arranged at the beginning of the continuous area storing the file data.

The "continuous area size" field stores a value indicating the size of the continuous area.

(4) Update Information Entry 204

FIG. 9 shows the structure of an update information entry 204.

The update information entry 204 is a directory entry for storing the information stored in the fields of the basic entry 201 that require updates when the file is rewritten or when data is additionally recorded into the file. The entry sequence may or may not include the update information entry 204 depending on the file. The entry sequence 27 includes only a single update information entry 204. The update information entry is arranged at a position near the end of the entry sequence 27. When the fields of the basic entry 201 are required to be updated, only the fields of the update information entry 204 are updated to maintain the latest update information.

The update information entry 204 eliminates the need for updating the basic entry 201, and thus eliminates the need for recalculating the cyclic shift checksum by referring to the basic entry 201 again. This enables the checksum calculation process to be performed at a higher speed.

The "type" field stores a fixed value indicating that this entry is an update information entry 204.

The "reserved" field is reserved for future extensibility. This field normally stores a value of 0x00.

The "timestamp" field, the "time zone" field, and the "file size" field store the same information as those fields of the basic entry 201.

When the entry sequence 27 includes the update information entry 204, the "timestamp", "time zone", and "file size" fields of the basic entry 201 are not used, and only the corresponding fields (the "timestamp", "time zone", and "file size" fields) of the update information entry 204 are used.

(5) Dummy Entry 205

FIG. 10 shows the structure of a dummy entry 205.

The dummy entry 205 is a directory entry for storing no effective data, and is used to reduce the overhead for calculating the cyclic shift checksum.

The "type" field stores a fixed value indicating that this entry is a dummy entry 205.

The "0x00 padding" stores a value of 0x00 to enable the cyclic shift checksum to be calculated easily.

The information recording system 1000 uses the entry sequence 27 that is formed for each file by combining these different types of directory entries described above.

An example of the entry sequence 27 will now be described with references to FIGS. 11 and 12.

1.2.3 Entry Sequence 27 for a Normal File

When the information recording system 1000 processes a file having a relatively small size (hereafter referred to as a "normal file"), the normal file processing unit 103 included in the access module 1 manages areas by mainly using the FAT (305, 306).

Figure 11:
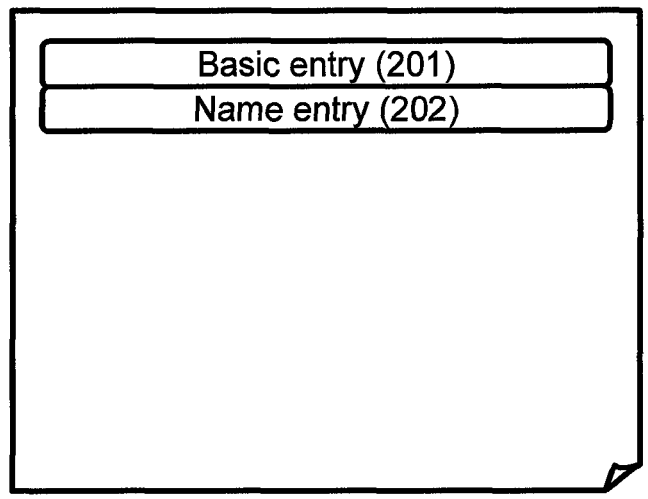
FIG. 11 is a schematic diagram showing one example of an entry sequence of a normal file in the first embodiment.

FIG. 11 shows an example of the entry sequence 27 for a normal file.

The entry sequence 27 for a normal file includes a basic entry 201, which stores basic information about the file, and a name entry 202, which stores the file name. Seeking in the normal file, which has a small file size, will be completed in a short time even when using the FAT (305, 306). Thus, the information recording system 1000 processes the normal file without using the extent information entry 203. As shown in FIG. 11, the entry sequence 27 for a normal file includes no extent information entry 203.

1.2.4 Entry Sequence 27 for an Extensible File

When the information recording system 1000 processes a file having a relatively large size (hereafter referred to as an "extensible file"), the extensible file processing unit 104 included in the access module 1 manages areas by mainly using the extent information entry 203.

Figure 12:
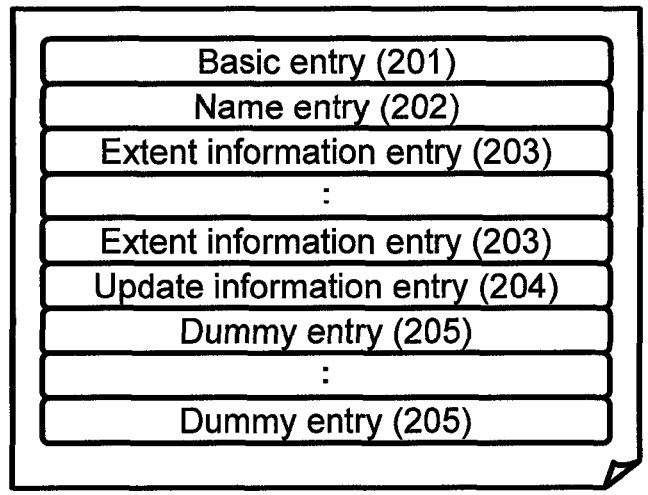
FIG. 12 is a schematic diagram showing one example of an entry sequence of an extensible file in the first embodiment.

FIG. 12 shows an example of the entry sequence 27 for an extensible file.

The entry sequence 27 for an extensible file includes a basic entry 201 and a name entry 202 at its beginning, which are then followed by at least one extent information entry 203 each storing information about the position and size of a file data storage area.

The entry sequence 27 further includes an update information entry 204 at a position immediately following the end of the at least one extent information entries 203, which are then followed by a predetermined number of dummy entries 205.

Seeking in the extensible file, which has a large file size, requires a long time using the FAT (305, 306). To avoid this, when the information recording system 1000 processes an extensible file, the system performs seeking using the extent information entry 203. This enables the seeking to be performed at a higher speed in the FAT file system. Further, the update information entry 204 and the dummy entries 205 enable the cyclic shift checksum to be calculated at a higher speed.

1.3 File Data Writing Process

A file data writing process performed in the information recording system 1000 will now be described with references to FIG. 13. The information recording system 1000 performs completely different processing for a normal file and for an extensible file.

The file data writing process performed in the information recording system 1000 will be described in detail.

S1301:

The access module 1 detects an entry sequence 27 corresponding to a writing target file, and reads the basic entry 201 and the name entry 202 of the detected entry sequence 27 from the information recording module 2.

S1302:

The access module 1 then determines whether the entry sequence 27 includes an extent information entry 203. When the entry sequence 27 includes no extent information entry 203, the access module 1 determines that the target file and proceeds to step S1303. When the entry sequence 27 includes an extent information entry 203, the access module 1 determines that the target file is an extensible file and proceeds to step S1310.

Processing for a Normal File

S1303:

When determining that the target file is a normal file in step S1302, the access module 1 refers to the area management information, such as the FAT (305, 306), and obtains an available storage area, and transmits to the information recording module 2 a command for writing the file data into the available storage area. In accordance with the command transmitted from the access module 1, the information recording module 2 writes the file data into the available storage area of the nonvolatile memory 25.

This processing is identical to the processing for obtaining an available storage area and writing data performed by a conventional FAT file system.

S1304:

In accordance with a command transmitted from the access module 1, the information recording module 2 updates the area management information such as the FAT (305, 306), and writes the updated area management information into the nonvolatile memory 25 of the information recording module 2.

This processing is also identical to the processing for updating area management information performed by a conventional FAT file system.

S1305:

The access module 1 updates the "timestamp", "time zone", and "file size" fields included in the basic entry 201 using the RAM 12 included in the access module 1.

S1306:

The access module 1 refers to the basic entry 201 and the name entry 202 to calculate the cyclic shift checksum.

S1307:

The access module 1 stores the checksum value calculated in S1306 using the RAM 12 included in the access module 1 into the "checksum" field included in the basic entry 201.

S1308:

The access module 1 transmits, to the information recording module 2, a command for writing the basic entry 201 updated using the RAM 12 included in the access module 1 into the information recording module 2. In accordance with the command transmitted from the access module 1, the information recording module 2 writes the basic entry 201 updated using the RAM 12 included in the access module 1 into the nonvolatile memory 25 of the information recording module 2.

S1309:

The access module 1 determines whether the entire target file data has been written completely. When the data has been written completely, the access module 1 ends the process. When the data has yet to be written completely, the access module 1 returns to step S1303.

Processing for an Extensible File

S1310:

When determining that the target file is an extensible file in step S1302, the access module 1 calculates the cyclic shift checksum value (C1) with reference to the entry sequence 27 from the basic entry 201 arranged at the beginning to the end of the extent information entry 203.

S1311:

The access module 1 then transmits, to the information recording module 2, a command for referring to the area management information, such as the FAT (305, 306), obtaining an available storage area, and writing the file data into the available storage area. In accordance with the command transmitted from the access module 1, the information recording module 2 writes the file data into the available storage area of the nonvolatile memory 25.

This processing is identical to the processing for obtaining an available storage area and writing data performed by a conventional FAT file system.

S1312:

The access module 1 updates the area management information, such as the FAT (305, 306), and transmits, to the information recording module 2, a command for writing the updated area management information into the information recording module 2. In accordance with the command transmitted from the access module 1, the information recording module 2 writes the updated area management information into the nonvolatile memory 25.

This processing is also identical to the processing for updating area management information performed by a conventional FAT file system.

S1313:

The access module 1 then adds a new extent information entry 203 at the end of the extent information entry 203 of the entry sequence 27, that is, at the position of the update information entry 204, using the RAM 12 included in the access module 1. Information indicating the position and size of the available storage area obtained in step S1311 is then stored into the new extent information entry 203.

S1314:

The access module 1 relocates the existing update information entry 204 to a position immediately following the end of the newest extent information entry 203 using the RAM 12 included in the access module 1. The access module 1 stores the latest information into the "timestamp", "time zone", and "file size" fields.

S1315:

The access module 1 then adds a cyclic shift checksum C_extent, which is calculated for the extent information entry 203 added in step S1313, to the checksum value C1 (C2). In other words, the access module 1 performs the processing written as $$C2=C1+C\_extent.$$

S1316:

The access module 1 then adds a cyclic shift checksum C_update, which is calculated for the update information entry 204 updated in step S1314, to the checksum value C2 (C3). In other words, the access module 1 performs the processing written as $$C3=C2+C\_update.$$

S1317:

The access module 1 calculates the cyclic shift checksum for the dummy entry 205 included in the entry sequence 27, and adds the calculated checksum value C_dummy to the checksum value C3 (C4). In other words, the access module 1 performs the processing written as $$C4=C3+C\_dummy.$$

Figure 5:
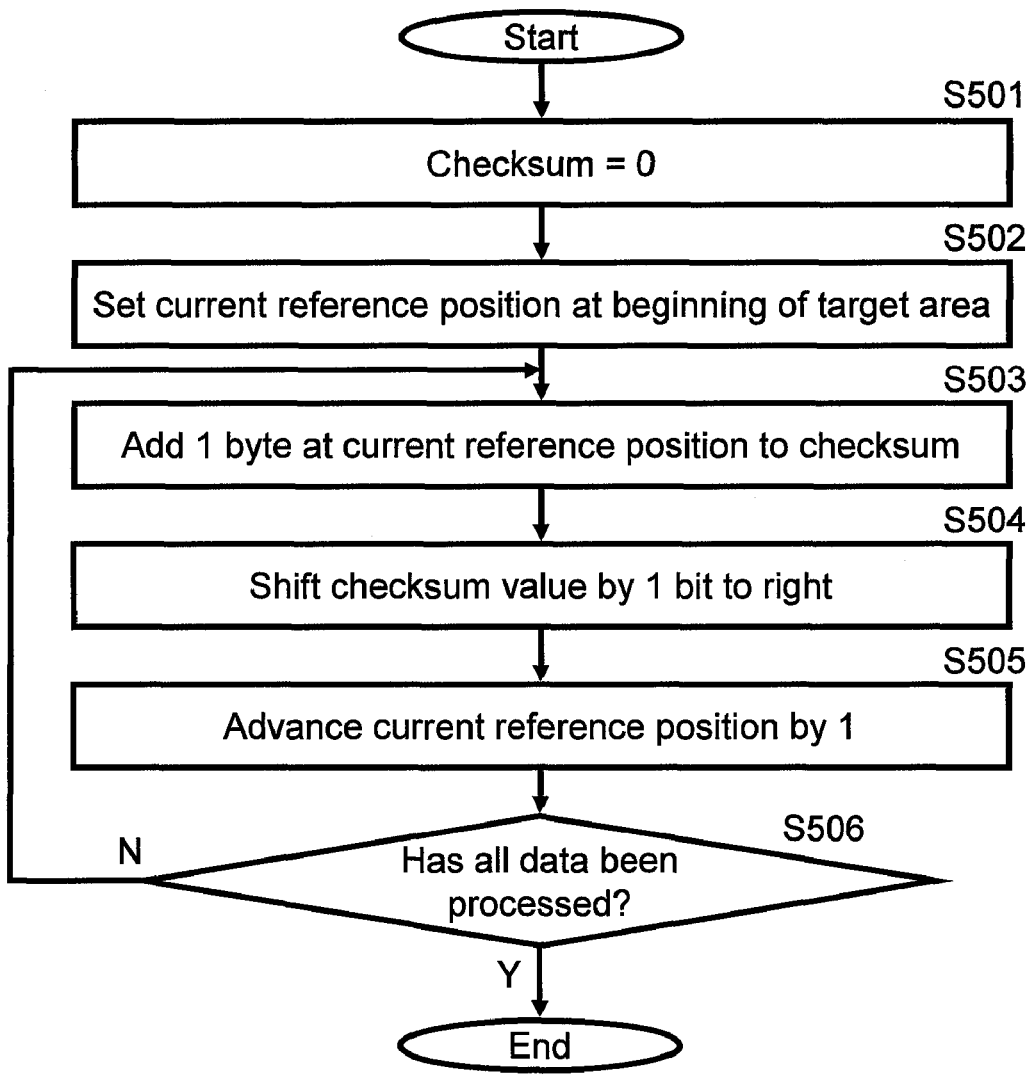
FIG. 5 is a flowchart showing a conventional cyclic shift checksum calculation process.

When the checksum value has a length of 16 bits, $$C4=C3+\text{value in the "type" field}*\text{number of dummy entries},$$

which is obtained through the cyclic shift checksum calculation process shown in FIG. 5. This is because the dummy entry 205 has a size of 32 bytes, which is a multiple number of 16, and the "0x00 padding" field is all set to 0x00. In other word, because the length of the dummy entry 205 is a multiple number of 16, the bit position of the "type" field to be added in the calculation is constantly fixed. In this case, the calculation associated with the value of the "type" field can be replaced by the processing of simply adding the value of the "type" field the number of times corresponding to the number of dummy entries. Also, the "0x00 padding" field is all set to 0x00. These values do not affect the checksum value.

To calculate the checksum value C4, the area corresponding to the dummy entry 205 does not need to be actually read from the information recording module 2. The cyclic shift checksum can therefore be calculated through the simple arithmetic processing described above.

In the cyclic shift checksum calculation process shown in FIG. 5, the bit length of the checksum value should not be limited to the 16-bit length (2-byte length) described above. For example, the bit length of the checksum value may be an 8-bit length (1-byte length).

S1318:

The access module 1 stores the checksum value C4 calculated in S1317 into the "checksum" field of the basic entry 201 using the RAM 12 included in the access module 1.

S1319:

The access module 1 transmits, to the information recording module 2, a command for writing the basic entry 201 that has been updated using the RAM 12 included in the access module 1, and the extent information entry 203 that has been added in step S1313, and the update information entry 204 into the information recording module 2. In accordance with the command transmitted from the access module 1, the information recording module 2 writes the updated basic entry 201, the extent information entry 203 added in step S1313, and the update information entry 204 into the nonvolatile memory 25 included in the information recording module 2.

S1320:

The access module 1 determines whether the entire target file data has been written completely. When the data has been written completely, the access module 1 ends the process. When the data has yet to be written completely, the access module 1 proceeds to the processing in step S1321.

S1321:

When determining that the entire file data has yet to be written completely in step S1320, the access module 1 substitutes the checksum value C2 for the checksum value C1, and returns to step S1311.

Example of Structure of Entry Sequence 27

Through the processes described above, the number of extent information entries 203 increases every time when a file data is additionally recorded into the file. An example of the structure of the entry sequence 27 in this case will now be described with reference to FIGS. 14A to 14C.

Figure 14:
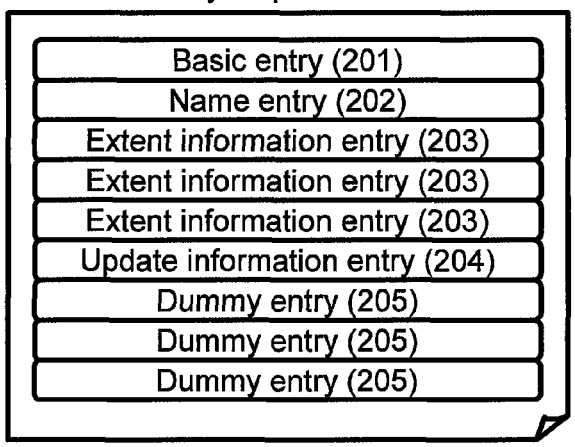
FIGS. 14A to 14C are schematic diagrams each showing an example of update of the entry sequence of the extensible file in the first embodiment.
Figure 14:
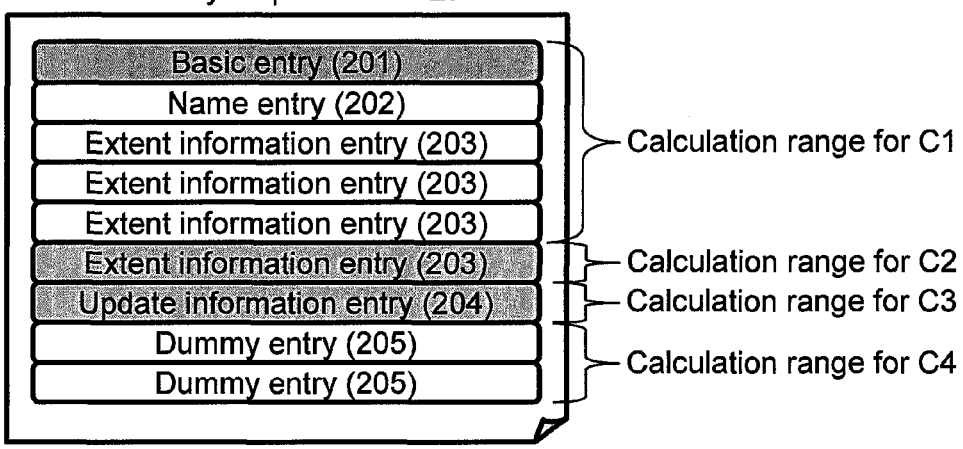
Figure 14:
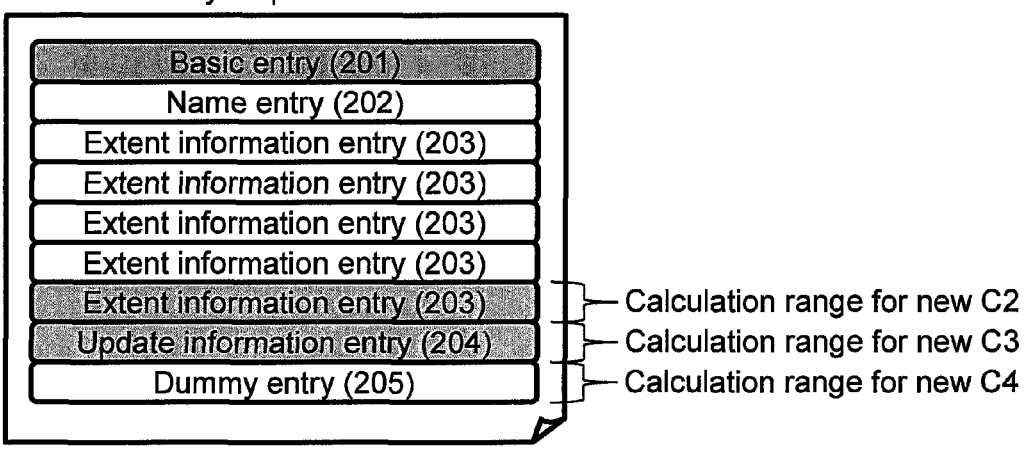

FIG. 14A shows an example of the entry sequence 27 in an initial state before the file data is written. In this state, file data has already been written in three continuous areas. The continuous areas are managed using three extent information entries 203.

FIG. 14B shows an example of the entry sequence 27 in the state shown in FIG. 14A to which file data has been additionally recorded.

In this case, the five directory entries shown in FIG. 14B (five directory entries that fall within the calculation range for the value C1 in FIG. 14B) are referred to when the value C1 is calculated in step S1310.

In the same manner, the single directory entry shown in FIG. 14B (the single directory entry that falls within the calculation range for the value C2 in FIG. 14B) is referred to when the value C2 is calculated, and the single directory entry shown in FIG. 14B (the single directory entry that falls within the calculation range for the value C3 in FIG. 14B) is referred to when the value C3 is calculated.

Further, the two directory entries shown in FIG. 14B (the two directory entries that fall within the calculation range for the value C4 in FIG. 14B) are used when the value C4 is calculated in step 1317, but these directory entries do not need to be actually referred to. The value C4 can instead be calculated through simple arithmetic processing.

The three directory entries shown as colored areas (areas with gray background) in FIG. 14B (the basic directory entry 201, the extent information entry 203, and the update information entry 204) are written into the information recording module 2 in step S1319.

FIG. 14C shows an example of the entry sequence 27 in the state shown in FIG. 14B to which file data has been further additionally recorded.

In this case, the value C1 (the value C1 is identical to the value C2 in FIG. 14B) has already been calculated in step S1321. Thus, the single directory entry shown in FIG. 14C (the single directory entry that falls within the calculation range for the new value C2 in FIG. 14C) is referred to when the value C2 is calculated in FIG. 14C, and the single directory entry shown in FIG. 14C (the single directory entry that falls within the calculation range for the new value C3 in FIG. 14C) is referred to when the value C3 is calculated in FIG. 14C.

Further, the directory entry shown in FIG. 14C (the directory entry that falls within the calculation range for the new value C4 in FIG. 14C) is used when the value C4 is calculated in step S1317, but this directory entry does not need to be actually referred to. The value C4 can instead be calculated through simple arithmetic processing. Three directory entries shown as colored areas (areas with gray background) in FIG. 14C (the basic directory entry 201, the extent information entry 203, and the update information entry 204) are written into the information recording module 2 in step S1319.

As shown in FIG. 14B, to calculate the values C1, C2, and C3 in the information recording system 1000 when file data is additionally recorded for the first time, seven directory entries need to be referred to in total.

As shown in FIG. 14C, to calculate the values C2 and C3 when file data is additionally recorded for the second time or more, only two directory entries need to be referred to in total.

In this manner, the file data writing process performed in the information recording system 1000 requires a smaller amount of data to be referred to when file data is additionally recorded and the cyclic shift checksum is to be calculated. Thus, the information recording system 1000 calculates the checksum at a high speed.

With the process described with reference to FIG. 13, only the "checksum" field of the basic entry 201 needs to be updated but the other fields of the basic entry 201 do not need to be updated. This structure is enabled not only through the use of the update information entry 204 but also through having a prepared area for storing a predetermined number of directory entries when, for example, a file is created, and arranging dummy entries 205 around the end of the prepared area.

For example, the information recording system 1000 may prepare a storage area for storing 32 directory entries when a file is created, and arrange dummy entries 205 into the prepared storage area. In this case, the basic entry 201, the name entry 202, the extent information entry 203, and the update information entry 204 may be stored by rewriting the dummy entries 205 as necessary sequentially from the first dummy entry.

In this case, the information recording system 1000 is only required to constantly store a value of 31 in the "secondary entry number" field included in the basic entry 201, and eliminates the need for updating the basic entry 201. However, when the dummy entries 205 prepared in advance are all used up, a new storage area for storing directory entries needs to be prepared, and dummy entries 205 are stored into the newly prepared area. In this case, the value of the "secondary entry number" field included in the basic entry 201 changes. Only in this case, the information recording system 1000 is required to recalculate the cyclic shift checksum by referring to the entire entry sequence 27. To reduce the need to recalculate the cyclic shift checksum, the information recording system 1000 should prepare a sufficiently large directory entry area when a file is created.

In the information recording system 1000, as described above, the nonvolatile memory 25 of the information recording module 2 is managed using the FAT file system 26, and a plurality of directory entries are allocated to a single file.

Further, the cyclic shift checksum is used to enhance the reliability of the plurality of directory entries. When the information recording system 1000 processes a file having a large size, the extent information entry 203 is used to manage information indicating the position and size of a continuous area for the large file.

As a result, the information recording system 1000 enables seeking, which can be a weakness of an FAT file system, to be performed at a higher speed.

Further, the information recording system 1000 employs the update information entry 204 and the dummy entry 205, thereby reduces the overhead for recalculating the cyclic shift checksum when file data is written. This increases the processing speed of the information recording system 1000.

Although the present invention is described based on the above embodiment, the present invention should not be limited to the above embodiment. The above embodiment can be modified without departing from the scope and spirit of the present invention. The numerical values used in the above embodiment are a mere example, and other values may be used instead. For example, although the above embodiment describes the case in which a storage area for storing 32 directory entries is prepared when a file is created, a storage area for storing a different number of directory entries may be prepared.

Although the present embodiment describes the case in which the information recording system 1000 processes two types of files, namely a normal file and an extensible file, the present invention should not be limited to this structure. The information recording system 1000 may process all files as extensible files.

The structure of each type of directory entry described in the present embodiment is a mere example, fields may be added to the structure of each directory entry, or fields of each directory entry may be modified or removed as required. Information stored in a single directory entry may be divided and stored separately into a plurality of directory entries, or separate information stored over a plurality of directory entries may be combined and stored into a single directory entry. For example, the "file name" field included in the name entry 202 may be moved to a different independent directory entry. In this case, even when the length of the file name exceeds 28 bytes, which is the maximum storage capacity of the name entry 202, such a file name can simply be stored into a plurality of independent directory entries in the entry sequence 27.

Alternatively, the extent information entry 203 may store information indicating the positions and sizes of a plurality of continuous areas. This reduces the number of extent information entries 203 per file, and enables the information recording system 1000 to manage continuous areas more efficiently.

The structure of the entry sequence 27 described in the present embodiment is a mere example. A new directory entry may be defined as required and may be added to the entry sequence 27, or the entry sequence 27 may be modified in another way.

Although the FAT (305, 306) is used as the area management information in the processing of steps S1311 and S1312, the FAT (305, 306) may not necessarily be used.

For example, the FAT (305, 306) may be used as a table for managing only link information indicating links between clusters, and an allocation bitmap may be separately used for managing available storage areas. In this case, only an allocation bitmap is used in the processing of steps S1311 and S1312, and the FAT (305, 306) does not need to be used. More specifically, the link information managed using the FAT (305, 306) is managed using the extent information entry 203, and thus the FAT (305, 306) does not need to be used in the above processing.

Figure 13:
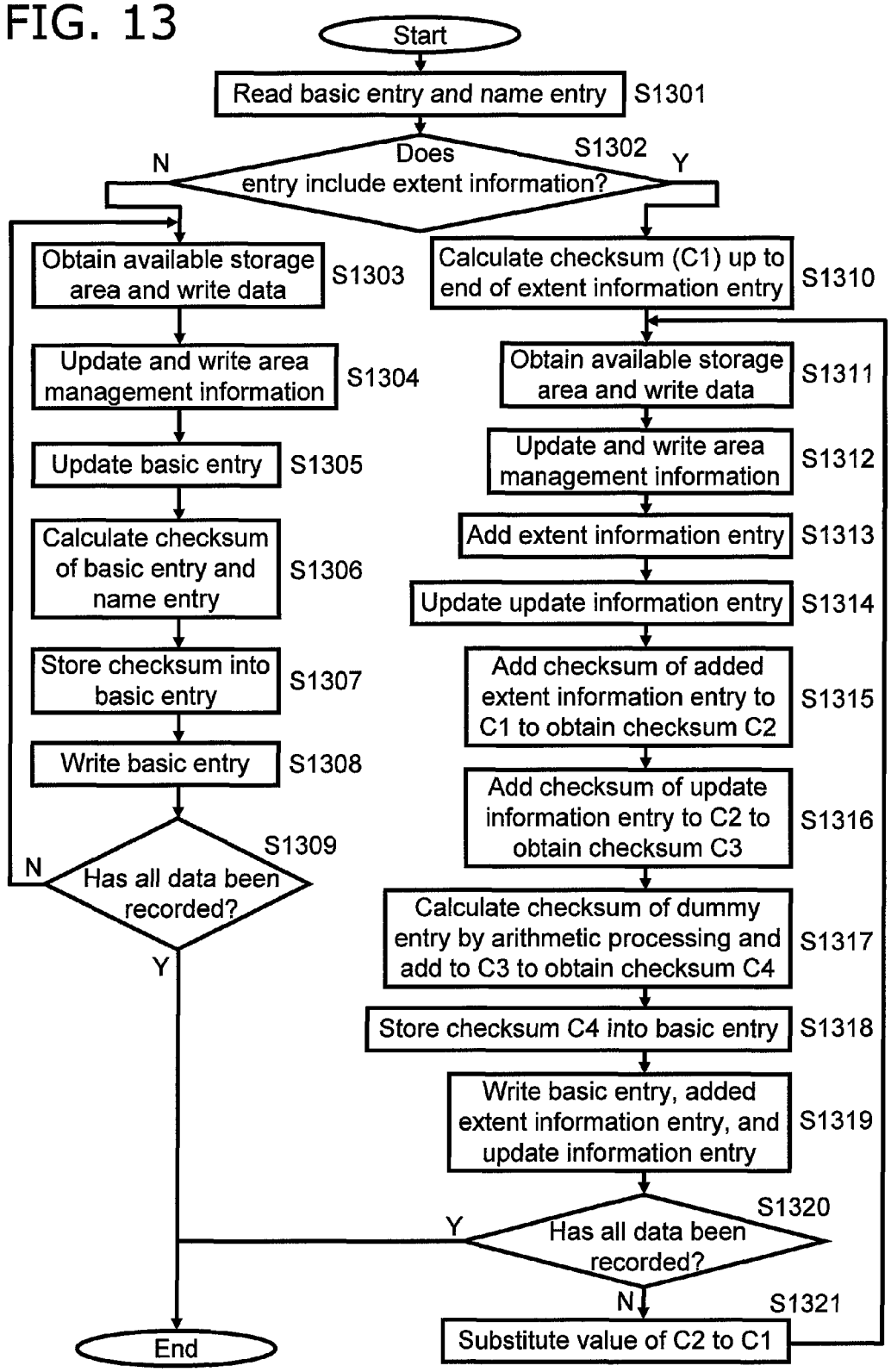
FIG. 13 is a flowchart showing a file data writing process according to the first embodiment.

In the process shown in FIG. 13, an extent information entry 203 is added every time when an available storage area is obtained and data is written into an extensible file.

However, when the available storage area obtained in step S1311 and an area storing the file data immediately preceding the current writing target data are continuously connected to each other, an extent information entry 203 may not necessarily be added.

When, for example, a single file is to be continuously recorded on the vacant memory immediately after the memory is formatted, continuous areas are always available for the file. In this case, the entry sequence will include only a single extent information entry 203, which indicates the positions and sizes of storage areas for the entire file data.

Although the above embodiment describes the case in which the reliability of directory entries is enhanced using the cyclic shift checksum, the present invention should not be limited to this structure. For example, methods other than the cyclic shift checksum, such as methods using a cyclic redundancy check (CRC) and a hash value (hash function), may also be used.

The above embodiment describes the case in which the "secondary entry number" field included in the basic entry 201 has 1 byte. In this case, the maximum number of directory entries that can be included in the entry sequence 27 is 256. The "secondary entry number" field may be extended to 2 bytes to enable more directory entries to be included in the entry sequence 27. Alternatively, a plurality of entry sequences 27 may be connected to one another to store management information for a single file.

Figure 16:
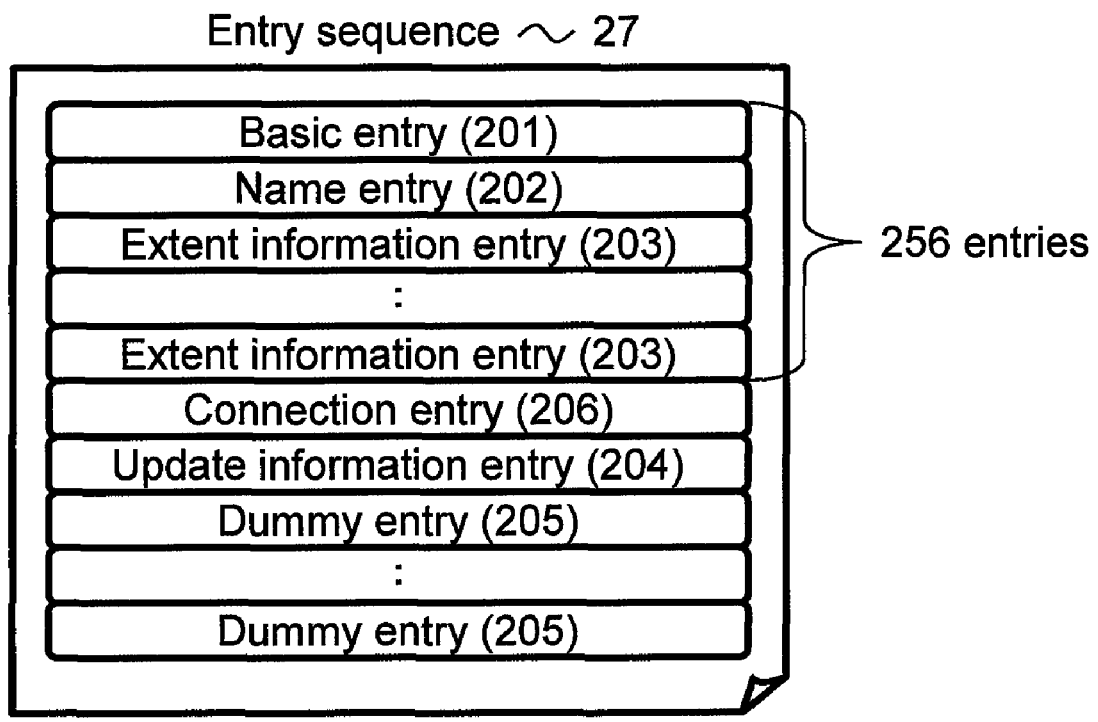
FIG. 16 is a schematic diagram showing another example of the entry sequence of the extensible file in the first embodiment.

In this case, for example, the entry sequence 27 may have the structure show in FIG. 16, in which a connection entry 206 shown in FIG. 15 is newly defined.

In FIG. 16, the "secondary entry number" field in the basic entry 201 is set to 255. The "checksum" field in the basic entry 201 stores a checksum value calculated using the first 256 entries. The $257^{th}$ directory entry stores the connection entry 206, which indicates that the immediately preceding entry sequence 27 is to be continued. In this manner, the number of directory entries that can be allocated to a single file can be increased by inserting the connection entry 206 at every $256^{th}$ entry.

Second Embodiment

A second embodiment of the present invention will now be described.

Figure 17:
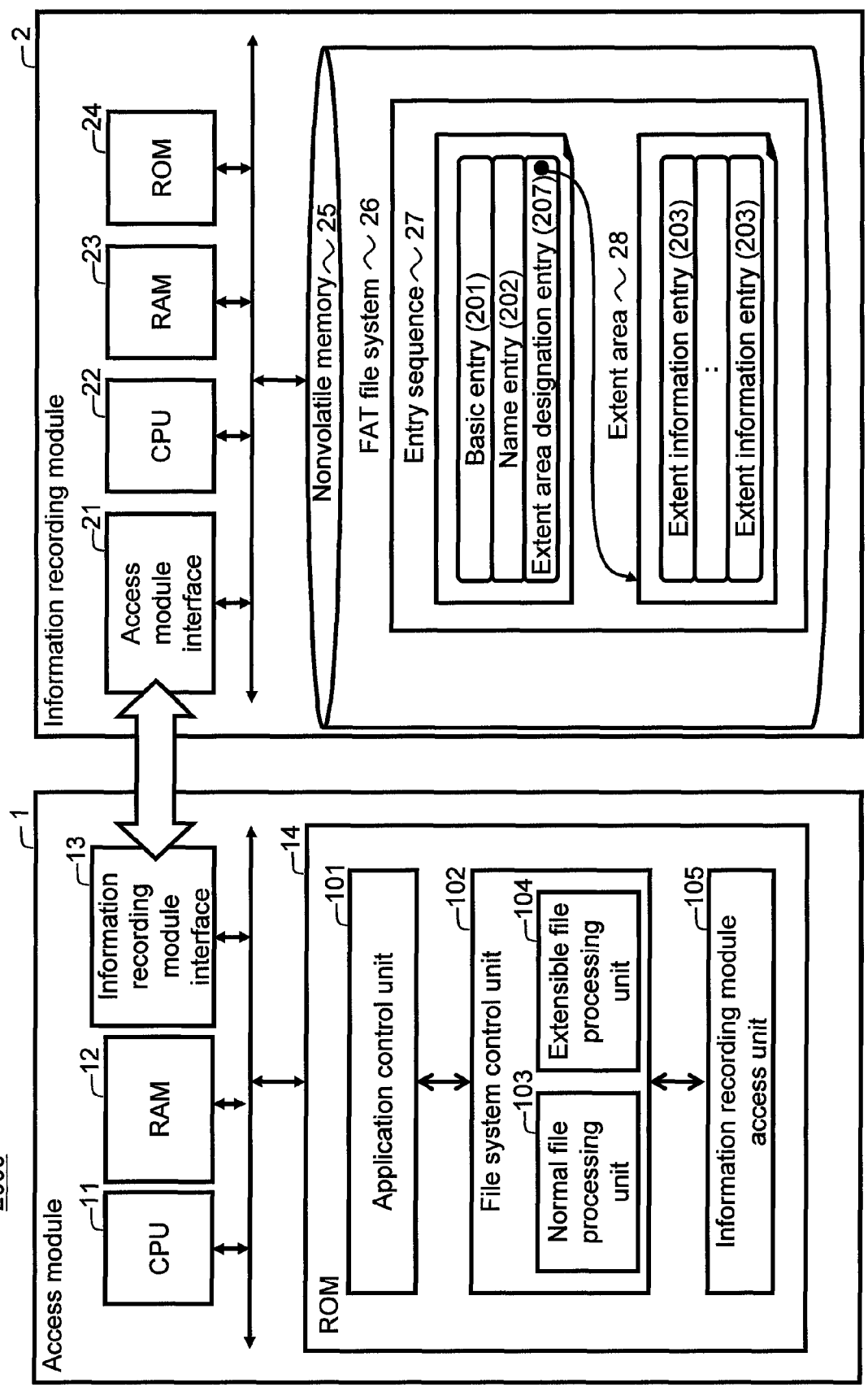
FIG. 17 is a schematic diagram showing the structure of an access module and an information recording module according to a second embodiment of the present invention.

FIG. 17 shows the structure of an information recording system 2000 according to the second embodiment of the present invention. As shown in FIG. 17, the information recording system 2000 includes an access module 1 and an information recording module 2.

The information recording system 2000 of the present embodiment (see FIG. 17) differs from the information recording system 1000 of the first embodiment (see FIG. 1) in the structure of the FAT file system 26 that is configured in the nonvolatile memory 25 of the information recording module 2. The other structures of the information recording system 2000 are identical to those of the information recording system 1000, and will not be described in detail.

The information recording system 1000 of the first embodiment uses the entry sequence 27 including the extent information entry 203, the update information entry 204, and the dummy entries 205, whereas the information recording system 2000 of the second embodiment uses an entry sequence 27 including none of these entries but additionally including an extent area designation entry 207. The information recording system 2000 of the second embodiment allocates a cluster to the extent information entry 203 and stores the extent information entry 203 into the allocated cluster without storing the extent information entry 203 directly into the entry sequence 27.

The information recording system 2000 prevents the size of the entry sequence 27 from increasing, and enables the cyclic shift checksum to be calculated at a high speed.

Structure of Extent Area Designation Entry 207

FIG. 18 shows the structure of an extent area designation entry 207.

The extent area designation entry 207 is a directory entry for storing information indicating the position of an area storing an extent information entry 203 corresponding to the file.

The "type" field stores a fixed value indicating that this entry is an extent area designation entry 207.

The "reserved" field is reserved for future extensibility. This field normally stores a value of 0x00.

The "first cluster number" field stores a cluster number of a first cluster arranged at the beginning of an area storing the extent information entry 203.

The "extent area size" field stores a value indicating the size of the entire area.

The entry sequence 27 used by the information recording system 2000 of the present embodiment includes the basic entry 201, the name entry 202, and the extent area designation entry 207.

The extent information entry 203 is stored in a cluster indicated by the extent area designation entry 207, and thus is not included in the entry sequence 27. This reduces the size of the entry sequence 27 used by the information recording system 2000. As a result, the information recording system 2000 calculates the cyclic shift checksum at a high speed. Information that requires updates, such as information about a timestamp and a file size, is updated by directly updating the basic entry 201. This eliminates the need for the update information entry 204.

Further, the entry sequence 27 used by the information recording system 2000 maintains its size to be unchanged when file data is written. This eliminates the need for the dummy entries 205.

File Data Writing Process

A file data writing process performed in the information recording system 2000 will now be described with references to FIG. 19.

Figure 19:
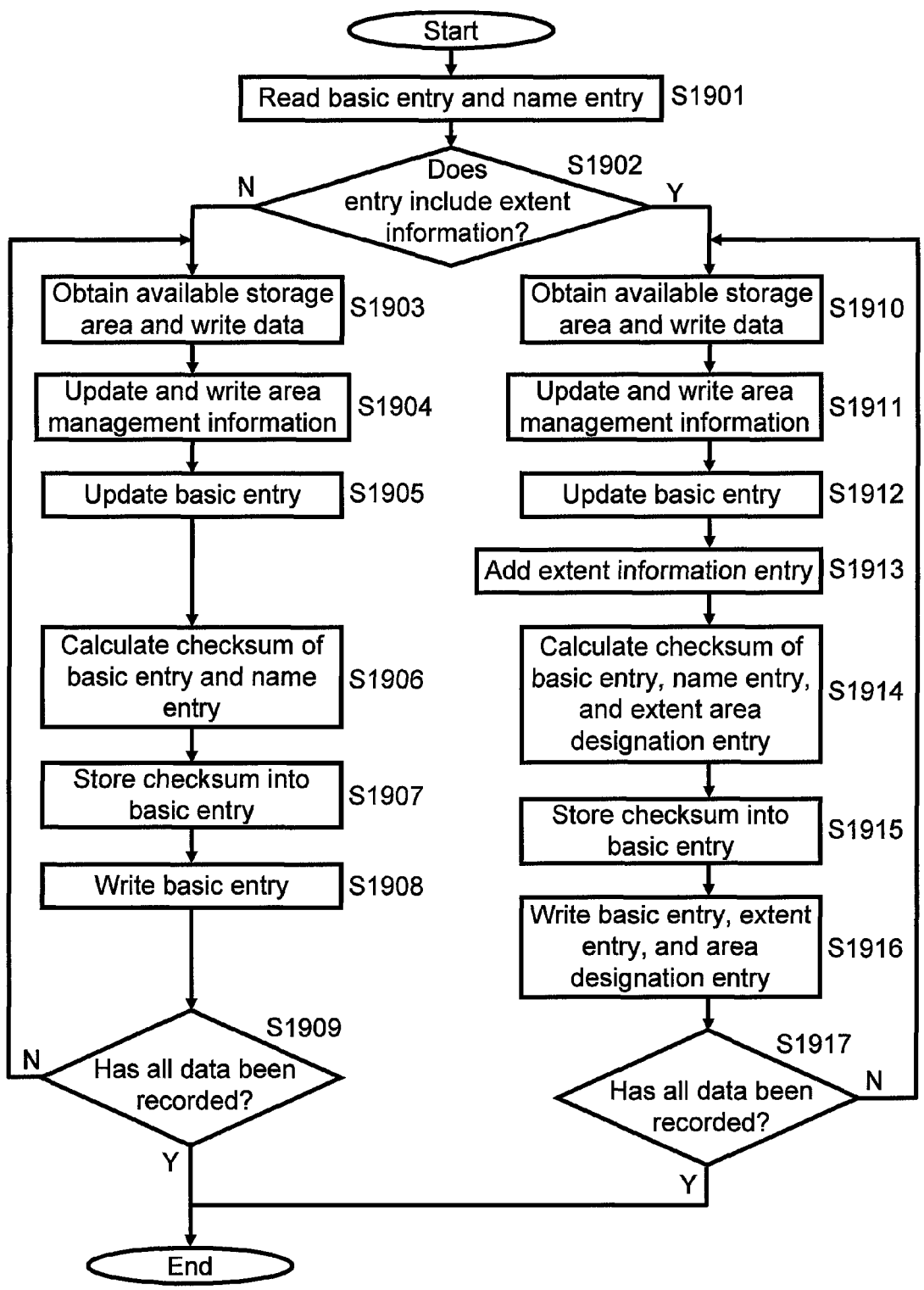
FIG. 19 is a flowchart showing a file data writing process according to the second embodiment.

In the process described in FIG. 19, the information recording system 2000 performs different processing for a normal file and for an extensible file, like in the process described with references to FIG. 13.

S1901:

The access module 1 detects an entry sequence 27 corresponding to a writing target file, and reads the basic entry 201 and the name entry 202 of the detected entry sequence 27 from the information recording module 2.

S1902:

The access module 1 refers to the extent area designation entry 207, and then determines whether the extent area 28 includes an extent information entry 203.

When the extent area 28 includes no extent information entry 203, the access module 1 determines that the file is a normal file and proceeds to step S1903. When the extent area 28 includes an extent information entry 203, the access module 1 determines that the file is an extensible file and proceeds to step S1910.

The processing for a normal file, or the processing in step S1903 and subsequent steps, is identical to the processing described with references to FIG. 13, and will not be described.

Processing for an Extensible File

S1910:

When determining that the target file is an extensible file in step S1902, the access module 1 transmits, to the information recording module 2, a command for referring to area management information, such as the FAT (305, 306), obtaining an available storage area, and writing file data into the available storage area. In accordance with the command transmitted from the access module 1, the information recording module 2 writes the file data into the available storage area of the nonvolatile memory 25.

This processing is identical to the processing for obtaining an available storage area and writing data performed by a conventional FAT file system.

S1911:

The access module 1 updates the area management information, such as the FAT (305, 306), and transmits to the information recording module 2 a command for writing the updated area management information into the information recording module 2. In accordance with the command transmitted from the access module 1, the information recording module 2 writes the updated area management information into the nonvolatile memory 25.

This processing is also identical to the processing for updating area management information performed by a conventional FAT file system.

S1912:

The access module 1 updates the "timestamp", "time zone", and "file size" fields of the basic entry 201 using the RAM 12 included in the access module 1.

S1913:

The access module 1 transmits to the information recording module 2 a command for adding an extent information entry 203 into a cluster that is allocated as an extent area 28, and writing the resulting data into the information recording module 2. In accordance with the command transmitted from the access module 1, the information recording module 2 adds the extent information entry 203 into the cluster that is allocated as the extent area 28, and writes the resulting data into the information recording module 2.

The extent information entry 203 stores information indicating the position and size of the available storage area obtained in step S1910.

The added extent information entry 203 will change the size of the extent area 28. Thus, the access module 1 updates the "extent area size" field of the extent area designation entry 207 using the RAM 12 included in the access module 1.

S1914:

The access module 1 calculates the cyclic shift checksum with reference to the basic entry 201, the name entry 202, and the extent area designation entry 207.

S1915:

The access module 1 then stores the checksum value calculated in step S1914 using the RAM 12 of the access module 1, and stores the calculated value into the "checksum" field of the basic entry 201.

S1916:

The access module 1 then transmits to the information recording module 2 a command for writing the basic entry 201 and the extent area designation entry 207, which have been updated using the RAM 12 of the access module 1, into the information recording module 2. In accordance with the command transmitted from the access module 1, the information recording module 2 writes the updated basic entry 201 and the updated extent area designation entry 207 into the nonvolatile memory 25 of the information recording module 2.

S1917:

The access module 1 determines whether the entire target file data has been written completely. When the data has been written completely, the access module 1 ends the process. When the data has yet to be written completely, the access module 1 returns to step S1910.

In this manner, the information recording system 2000 allocates a cluster as an extent area 28 for an extensible file, and stores an extent information entry 203 into the extent area. This prevents the size of the entry sequence 27 for the file from increasing, and reduces the overhead for calculating the cyclic shift checksum.

In the information recording system 2000 as described above, the nonvolatile memory 25 of the information recording module 2 is managed using the FAT file system 26, and a plurality of directory entries are allocated to a single file.

Further, the cyclic shift checksum is used to enhance the reliability of the plurality of directory entries. When the information recording system 2000 processes a file having a large size, the extent information entry 203 is used to manage information indicating the position and size of a continuous area for the large file.

As a result, the information recording system 2000 enables seeking, which can be a weakness of an FAT file system, to be performed at a higher speed.

Further, the information recording system 2000 allocates a cluster as an extent area 28 for the file, and stores the extent information entry 203 into the extent area.

This structure prevents the size of the entry sequence 27 from increasing, and reduces the overhead for recalculating the cyclic shift checksum when file data is written, and increases the processing speed of the information recording system 2000.

Although the present invention is described based on the above embodiment, the present invention should not be limited to the above embodiment. The above embodiment may be modified without departing from the scope and spirit of the present invention. The various modifications described in the first embodiment may also be applied to the second embodiment.

The second embodiment of the present invention describes the case in which the extent information entry 203 is stored in the extent area 28. However, the extent area 28, which is different from a normal directory area into which the entry sequence 27 is stored, may not necessarily process an entry in the same manner as how the entry sequence 27 is processed. More specifically, the extent area 28 may not be in a format suitable for an entry having 32 bytes.

For example, the extent area 28 may store a plurality of entries each having 12 bytes consisting of a first cluster number having 4 bytes and an extent area size having 8 bytes.

Alternatively, the "extent area size" field of the extent area designation entry 207 may be eliminated, and the end of the extent area may be detected with other methods.

For example, the "file size" field of the basic entry 201 may be used to determine the size of the file. The determined size may then be compared with the sum of values stored in the "continuous area size" field of the extent information entries 203 stored in the extent area 28. The end of the extent area 28 may then be detected when the sum of the "continuous area size" values reaches the "file size".

Alternatively, data 0x00 may be written (zero stuffing (zero padding)) into an area of the extent area 28 in which no data has been written (area including no substantial data). The values of data written into the extent area 28 may be sequentially checked, and a position immediately preceding an area consisting of the data value of 0x00 may then be detected as the end position of the extent area 28 (end position of the area storing substantial data).

Other Embodiments

Each functional block of the access module (access device), the information recording module (information recording device), and the information recording system described in the above embodiments may be formed using a single chip with a semiconductor device, such as LSI (large-scale integration), or some or all of the blocks of the access module (access device), the information recording module (information recording device), and the information recording system may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiments may be realized using either hardware or software, or may be realized using both software and hardware. When the access module (access device), the information recording module (information recording device), and the information recording system of the above embodiments are implemented by hardware, the access module, the information recording module, and the information recording system require timing adjustment for each of their processes. For ease of explanation, timing adjustment associated with various signals required in an actual hardware design is not described in detail in the above embodiments.

The specific structures described in the above embodiments are mere examples of the present invention, and may be changed and modified variously without departing from the scope and spirit of the invention.

APPENDIXES

The present invention may also be expressed as follows.

Appendix 1

An access device that accesses an information recording device including a nonvolatile memory storing file data, the access device comprising:
a file system control unit that manages a file using an extent information entry, a file allocation table, and an entry group, the extent information entry managing the file data in units of fixed-length blocks and including, as management information for a continuous area including one or more fixed-length blocks, information for identifying at least a position and a size of the continuous area, the file allocation table managing information indicating a link between the fixed-length blocks, and the entry group being generated for a single file and internally including one or more fixed-length entries storing management information including information about a name and a size of the file and information about a checksum of the one or more fixed-length entries.

Appendix 2

The access device according to appendix 1, wherein
the entry group internally includes the extent information entry.

Appendix 3

The access device according to appendix 2, wherein
the file system control unit adds an extent information entry including information for identifying a position and a size of a continuous area every time when an independent continuous area storing data of the file increases.

Appendix 4

The access device according to appendix 3, wherein
the file system control unit generates an entry group including a predetermined number of entries every time when a file is created, and
stores a dummy entry having a predetermined format into an entry storing no effective information in the entry group.

Appendix 5

The access device according to appendix 4, wherein
the file system control unit stores a predetermined value into all areas of the dummy entry except a field of the dummy entry storing an identifier indicating the dummy entry.

Appendix 6

The access device according to appendix 5, wherein
the file system control unit erases the dummy entry when an extent information entry is added to the entry group to maintain a size of the entire entry group to be unchanged.

Appendix 7

The access device according to appendix 3, wherein
the file system control unit stores an update information entry storing information about a size of a file and a timestamp corresponding to the entry group in a manner that the update information entry follows the extent information entry.

Appendix 8

The access device according to appendix 7, wherein
the file system control unit shifts a storage position of the update information entry in a backward direction when an extent information entry is added to the entry group.

Appendix 9

The access device according to appendix 2, wherein
the information about the checksum is information including a calculation result of a cyclic shift checksum.

Appendix 10

The access device according to appendix 9, wherein
when an extent information entry is added, the file system control unit calculates the cyclic shift checksum by performing arithmetic processing based on the extent information entry to be added and the update information entry and performing arithmetic processing based on the number of dummy entries included in the entry group.

Appendix 11

The access device according to any one of appendixes 1 to 10, wherein
the file system control unit includes
an extensible file processing unit that accesses a file by controlling access to the file based on the extent information entry when the entry group corresponding to the file includes the extent information entry, and
a normal file processing unit that accesses a file by controlling access to the file based on the file allocation table when the entry group corresponding to the file includes no extent information entry.

Appendix 12

An information recording device including a nonvolatile memory storing file data, wherein
the file data is managed in units of fixed-length blocks, and
the nonvolatile memory stores an extent information entry, a file allocation table, and an entry group, the extent information entry including, as management information for a continuous area including one or more fixed-length blocks, information for identifying at least a position and a size of the continuous area, the file allocation table managing information indicating a link between the fixed-length blocks, and the entry group being generated for a single file and including one or more fixed-length entries storing management information including information about a name and a size of the file and internally including information about a checksum of the entry group corresponding to the file.

Appendix 13

The information recording device according to appendix 12, wherein
the entry group internally includes an extent information entry.

Appendix 14

The information recording device according to appendix 13, wherein
an extent information entry including information for identifying a position and a size of a continuous area is added to the entry group every time when an independent continuous area storing data of the file increases.

Appendix 15

The information recording device according to appendix 14, wherein
the entry group includes a predetermined number of entries when a file is created, and
a dummy entry having a predetermined format is stored into an entry storing no effective information in the entry group.

Appendix 16

The information recording device according to appendix 15, wherein
a predetermined value is stored into all areas of the dummy entry except a field of the dummy entry storing an identifier indicating the dummy entry.

Appendix 17

The information recording device according to appendix 16, wherein
when an extent information entry is added to the entry group, the dummy entry is erased from the entry group to maintain a size of the entire entry group to be unchanged.

Appendix 18

The information recording device according to appendix 14, wherein
the entry group stores an update information entry storing information about a size of a file and a timestamp corresponding to the entry group in a manner that the update information entry follows the extent information entry.

Appendix 19

The information recording device according to appendix 18, wherein
the entry group shifts a storage position of the update information entry in a backward direction when an extent information entry is added to the entry group.

Appendix 20

The information recording device according to appendix 12, wherein
the information about the checksum is information including a calculation result of a cyclic shift checksum.

Appendix 21

An information recording system comprising an information recording device including a nonvolatile memory storing file data and an access device that accesses the information recording device, wherein
the file data is managed in units of fixed-length blocks, and
the nonvolatile memory stores an extent information entry, a file allocation table, and an entry group, the extent information entry including, as management information for a continuous area including one or more fixed-length blocks, information for identifying at least a position and a size of the continuous area, the file allocation table managing information indicating a link between the fixed-length blocks, and the entry group being generated for a single file and internally including one or more fixed-length entries storing management information including information about a name and a size of the file and information about a checksum of the one or more fixed-length entries, and
the access device includes a file system control unit that manages a file stored in the nonvolatile memory using information stored in the nonvolatile memory.

Appendix 22

The information recording system according to appendix 21, wherein the extent information entry is stored internally in the entry group.

Appendix 23

An information recording system, comprising:
the access device according to any one of appendixes 1 to 11; and
the information recording device according to any one of appendixes 12 to 22.

Appendix 24

A file management method using a nonvolatile memory storing file data, the method comprising:
managing a file using an extent information entry, a file allocation table, and an entry group, the extent information entry managing the file data in units of fixed-length blocks and including, as management information for a continuous area including one or more fixed-length blocks, information for identifying at least a position and a size of the continuous area, the file allocation table managing information indicating a link between the fixed-length blocks, and the entry group being generated for a single file and internally including one or more fixed-length entries storing management information including information about a name and a size of the file and information about a checksum of the one or more fixed-length entries.

Appendix 25

A program enabling a computer to implement the file management method according to appendix 24.
Contents of Appendixes A first aspect of the present invention provides an access device that accesses an information recording device including a nonvolatile memory storing file data. The access device includes a file system control unit that manages a file using an extent information entry, a file allocation table, and an entry group.

The extent information entry manages the file data in units of fixed-length blocks, and includes, as management information for a continuous area including one or more fixed-length blocks, information for identifying at least a position and a size of the continuous area. The file allocation table manages information indicating a link between the fixed-length blocks. The entry group is generated for a single file, and internally includes one or more fixed-length entries storing management information including information about a name and a size of the file and information about a checksum of the one or more fixed-length entries.

In this access device, the file system control unit manages files using both the extent information entry and the file allocation table (FAT).

As a result, this access device manages, for example, files having a large size (extensible files) that are managed using an extent information entry and other normal files efficiently. The access device, which manages files using an extent information entry, enables seeking, which can be a weakness of an FAT file system, to be performed at a higher speed.

Further, this access device uses the entry group including information about a checksum for the entry group corresponding to the file, and thus detects inconsistency between entries. This enhances the reliability of a file system that is used by the access device.

The access device may be an access module.

A second aspect of the present invention provides the access device of the first aspect of the present invention in which the entry group internally includes the extent information entry.

A third aspect of the present invention provides the access device of the second aspect of the present invention in which the file system control unit adds an extent information entry including information for identifying a position and a size of a continuous area every time when an independent continuous area storing data of the file increases.

A fourth aspect of the present invention provides the access device of the third aspect of the present invention in which the file system control unit generates an entry group including a predetermined number of entries every time when a file is created, and stores a dummy entry having a predetermined format into an entry storing no effective information in the entry group.

A fifth aspect of the present invention provides the access device of the fourth aspect of the present invention in which the file system control unit stores a predetermined value into all areas of the dummy entry except a field of the dummy entry storing an identifier indicating the dummy entry.

This structure of the access device enables a calculation process for a checksum to be performed at a higher speed.

The predetermined value may be, for example, 0x00. This simplifies the calculation process for a checksum.

A sixth aspect of the present invention provides the access device of the fifth aspect of the present invention in which when an extent information entry is added to the entry group, the file system control unit erases the dummy entry to maintain a size of the entire entry group to be unchanged.

This access device maintains the size of the entire entry group to be unchanged. This fixes the processing target area for the checksum calculation performed in the access device. As a result, the access device performs the calculation process for a checksum at a higher speed.

A seventh aspect of the present invention provides the access device of the third aspect of the present invention in which the file system control unit stores an update information entry storing information about a size of a file and a timestamp corresponding to the entry group in a manner that the update information entry follows the extent information entry.

This access device stores an update information entry in a manner to follow an extent information entry. In this case, data stored in an area preceding the update entry is almost unchanged. As a result, the access device performs the calculation process for a checksum efficiently.

The term "to store in a manner to follow" means "to store at a subsequent logical address position in a logical address space". In the above example, the update information entry is stored in a logical address space area that follows a logical address space area in which the extent information entry is stored.

An eighth aspect of the present invention provides the access device of the seventh aspect of the present invention in which the file system control unit shifts a storage position of the update information entry in a backward direction when an extent information entry is added to the entry group.

The term "to shift in a backward direction" means "to shift an area in a backward direction in a logical address space".

A ninth aspect of the present invention provides the access device of the second aspect of the present invention in which the information about the checksum is information including a calculation result of a cyclic shift checksum.

This access device performs the arithmetic processing for a checksum using the cyclic shift checksum, and detects inconsistency between entries at a higher precision than the arithmetic processing for a checksum performed using a simple checksum.

A tenth aspect of the present invention provides the access device of the ninth aspect of the present invention in which when an extent information entry is added, the file system control unit calculates the cyclic shift checksum by performing arithmetic processing based on the extent information entry to be added and the update information entry and performing arithmetic processing based on the number of dummy entries included in the entry group.

An eleventh aspect of the present invention provides the access device of any one of the first to tenth aspects of the present invention in which the file system control unit includes an extensible file processing unit and a normal file processing unit.

The extensible file processing unit accesses a file by controlling access to the file based on the extent information entry when the entry group corresponding to the file includes the extent information entry.

The normal file processing unit accesses a file by controlling access to the file based on the file allocation table when the entry group corresponding to the file includes no extent information entry.

A twelfth aspect of the present invention provides an information recording device including a nonvolatile memory storing file data. The nonvolatile memory stores an extent information entry, a file allocation table, and an entry group.

The file data is managed in units of fixed-length blocks.

The extent information entry includes, as management information for a continuous area including one or more fixed-length blocks, information for identifying at least a position and a size of the continuous area. The file allocation table manages information indicating a link between the fixed-length blocks. The entry group is generated for a single file, and includes one or more fixed-length entries storing management information including information about a name and a size of the file and internally including information about a checksum of the entry group corresponding to the file.

This information recording device is, for example, controlled by an access device, to manage files using both the extent information entry and the file allocation table (FAT).

As a result, this information recording device manages, for example, files having a large size (extensible files) that are managed using an extent information entry and other normal files efficiently. The information recording device, which manages files using an extent information entry, enables seeking, which can be a weakness of an FAT file system, to be performed at a higher speed.

Further, this information recording device uses the entry group including information about a checksum for the entry group corresponding to the file, and thus detects inconsistency between entries. This enhances the reliability of a file system that is used by the access device.

The information recording device may be an information recording module.

A thirteenth aspect of the present invention provides the information recording device of the twelfth aspect of the present invention in which the entry group internally includes an extent information entry.

A fourteenth aspect of the present invention provides the information recording device of the thirteenth aspect of the present invention in which an extent information entry including information for identifying a position and a size of a continuous area is added to the entry group every time when an independent continuous area storing data of the file increases.

A fifteenth aspect of the present invention provides the information recording device of the fourteenth aspect of the present invention in which the entry group includes a predetermined number of entries when a file is created, and a dummy entry having a predetermined format is stored into an entry storing no effective information in the entry group.

A sixteenth aspect of the present invention provides the information recording device of the fifteenth aspect of the present invention in which a predetermined value is stored into all areas of the dummy entry except a field of the dummy entry storing an identifier indicating the dummy entry.

A seventeenth aspect of the present invention provides the information recording device of the sixteenth aspect of the present invention in which the dummy entry is erased from the entry group when an extent information entry is added to the entry group to maintain a size of the entire entry group to be unchanged.

An eighteenth aspect of the present invention provides the information recording device of the fourteenth aspect of the present invention in which the entry group stores an update information entry storing information about a size of a file and a timestamp corresponding to the entry group in a manner that the update information entry follows the extent information entry.

A nineteenth aspect of the present invention provides the information recording device of the eighteenth aspect of the present invention in which the entry group shifts a storage position of the update information entry in a backward direction when an extent information entry is added to the entry group.

A twentieth aspect of the present invention provides the information recording device of the twelfth aspect of the present invention in which the information about the checksum is information including a calculation result of a cyclic shift checksum.

A twenty first aspect of the present invention provides an information recording system including an information recording device including a nonvolatile memory storing file data and an access device that accesses the information recording device.

The file data is managed in units of fixed-length blocks.

The nonvolatile memory stores an extent information entry, a file allocation table, and an entry group.

The extent information entry includes, as management information for a continuous area including one or more fixed-length blocks, information for identifying at least a position and a size of the continuous area. The file allocation table manages information indicating a link between the fixed-length blocks. The entry group is generated for a single file, and internally includes one or more fixed-length entries storing management information including information about a name and a size of the file and information about a checksum of the one or more fixed-length entries.

The access device includes a file system control unit that manages a file stored in the nonvolatile memory using information stored in the nonvolatile memory.

In this information recording system, the file system control unit manages files using both the extent information entry and the file allocation table (FAT).

As a result, this information recording system manages, for example, files having a large size (extensible files) that are managed using an extent information entry and other normal files efficiently. The information recording system, which manages files using an extent information entry, enables seeking, which can be a weakness of an FAT file system, to be performed at a higher speed.

Further, this information recording system uses the entry group including information about a checksum for the entry group corresponding to the file, and thus detects inconsistency between entries. This enhances the reliability of a file system that is used by the access device.

A twenty second aspect of the present invention provides the information recording system of the twenty first aspect of the present invention in which the extent information entry is stored internally in the entry group.

A twenty third aspect of the present invention provides an information recording system including the access device according to any one of the first to eleventh aspects of the present invention, and the information recording device according to any one of the twelfth to twenty second aspects of the present invention.

A twenty fourth aspect of the present invention provides a file management method using a nonvolatile memory storing file data. The file management method includes managing a file using an extent information entry, a file allocation table, and an entry group.

The extent information entry manages the file data in units of fixed-length blocks, and includes, as management information for a continuous area including one or more fixed-length blocks, information for identifying at least a position and a size of the continuous area. The file allocation table manages information indicating a link between the fixed-length blocks. The entry group is generated for a single file, and internally includes one or more fixed-length entries storing management information including information about a name and a size of the file and information about a checksum of the one or more fixed-length entries.

With this file management method, files are managed using both the extent information entry and the file allocation table (FAT).

As a result, with this file management method, for example, files having a large size (extensible files) that are managed using an extent information entry and other normal files are managed efficiently. Also, the file management method, with which files are managed using an extent information entry, enables seeking, which can be a weakness of an FAT file system, to be performed at a higher speed.

Further, this file management method uses the entry group including information about a checksum for the entry group corresponding to the file, and thus enables inconsistency between entries to be detected. This enhances the reliability of a file system that is used by the file management method.

A twenty fifth aspect of the present invention provides a program enabling a computer to implement the file management method of the twenty fourth aspect of the present invention.

This program has the same advantageous effects as the file management method of the twenty fourth aspect of the present invention.

INDUSTRIAL APPLICABILITY

The nonvolatile memory 25 of the information recording module 2 of the present invention is managed using the FAT file system 26. In the nonvolatile memory 25, a plurality of directory entries are allocated to a single file.

The cyclic shift checksum is used to enhance the reliability of the plurality of directory entries. When processing a file having a large size, the information recording system of the present invention manages information indicating the position and size of a continuous area using the extent information entry 203. This structure of the information recording system of the present invention enables seeking, which can be a weakness of an FAT file system, to be performed at a higher speed.

The information recording system of the present invention further uses the update information entry 204 and the dummy entry 205 or uses the extent area designation entry 207. This structure reduces the overhead for recalculating the cyclic shift checksum when file data is written, and increases the processing speed of the information recording system. The access module 1 included in this information recording system is suitable for a device that processes digital content, such as music and still images and video images, and is particularly suitable for a device that processes content of a single file having a large size, and can be used as a PC application, an audio recorder, a DVD recorder, an HDD recorder, a movie, a digital still camera, or a portable telephone terminal.

The information recording module 2 of the present invention can be used as a removable medium, such as a memory card for storing the digital content, or as a built-in memory.

The invention claimed is:

1. An access device that accesses an information recording device including a nonvolatile memory storing file data, the access device comprising:

a file system control unit that manages a file using an extent information entry, a file allocation table, and an entry group, the extent information entry managing the file data in units of fixed-length blocks and including, as management information for a continuous area including one or more fixed-length blocks, information for identifying at least a position and a size of the continuous area, the file allocation table managing information indicating a link between the fixed-length blocks, and the entry group being generated for each file, and internally including one or more fixed-length entries storing management information including information about a name and a size of the file and information about a checksum of the one or more fixed-length entries, (1) wherein the file system control unit stores the extent information entry into an external area consisted of the fixed-length blocks, each of which has a predetermined length, the external area being external to the area of the entry group, (2) wherein the entry group includes an extent area designation entry including information for identifying a position and a size of the extent area, and (3) wherein the file system control unit includes an extensible file processing unit that, when accessing a file, controls access to the file based on the extent area designation entry and the extent area extent information entry when the entry group corresponding to the file includes the extent area designation entry, and a normal file processing unit that, when accessing a file, controls access to the file based on the file allocation table when the entry group corresponding to the file includes no extent area designation entry.

2. The access device according to claim 1, wherein the file system control unit adds an extent area extent information entry including information for identifying a position and a size of a continuous area every time when an independent continuous area storing data of the file increases.

3. The access device according to claim 2, wherein
a byte length of the extent area extent information entry is identical to a byte length of an entry included in the entry group.

4. The access device according to claim 2, wherein
a byte length of the extent area extent information entry is different from a byte length of an entry included in the entry group.

5. The access device according to claim 1, wherein
the information about the checksum includes a calculation result of a cyclic shift checksum.

6. An information recording device including a nonvolatile memory storing file data, wherein
the file data is managed in units of fixed-length blocks, and
the nonvolatile memory stores an extent information entry, a file allocation table, and an entry group, the extent information entry including, as management information for a continuous area including one or more fixed-length blocks, information for identifying at least a position and a size of the continuous area, the file allocation table managing information indicating a link between the fixed-length blocks, and the entry group being generated for a single file and internally including one or more fixed-length entries storing management information including information about a name and a size of the file and information about a checksum of the one or more fixed-length entries, and
(1) the extent information entry is stored into an area that is external to the entry group and is included in an extent area formed by a fixed-length block,
(2) the entry croup includes an extent area designation entry including information for identifying a position and a size of the extent area, and
(3) the information recording device, when accessing a file, controls access to the file based on the extent area designation entry and the extent area extent information entry when the entry croup corresponding to the file includes the extent area designation entry, and the information recording device, when accessing a file, controls access to the file based on the file allocation table when the entry croup corresponding to the file includes no extent area designation entry.

7. The information recording device according to claim 6, wherein
an extent area extent information entry including information for identifying a position and a size of a continuous area is added to the extent area every time when an independent continuous area storing data of the file increases.

8. The information recording device according to claim 7, wherein
a byte length of the extent area extent information entry is identical to a byte length of an entry included in the entry group.

9. The information recording device according to claim 7, wherein
a byte length of the extent area extent information entry is different from a byte length of an entry included in the entry group.

10. The information recording device according to claim 6, wherein
the information about the checksum includes a calculation result of a cyclic shift checksum.

11. An information recording system including an information recording device including a nonvolatile memory storing file data and an access device that accesses the information recording device, wherein
the file data is managed in units of fixed-length blocks, and
the nonvolatile memory stores an extent information entry, a file allocation table, and an entry group, the extent information entry including, as management information for a continuous area including one or more fixed-length blocks, information for identifying at least a position and a size of the continuous area, the file allocation table managing information indicating a link between the fixed-length blocks, and the entry group being generated for a single file and internally including one or more fixed-length entries storing management information including information about a name and a size of the file and information about a checksum of the one or more fixed-length entries,
the access device includes a file system control unit that manages a file stored in the nonvolatile memory using information stored in the nonvolatile memory,
(1) the extent information entry is stored into an area that is external to the entry group and is included in an extent area formed by a fixed-length block,
(2) the entry group includes an extent area designation entry including information for identifying a position and a size of the extent area, and
(3) the file system control unit includes
an extensible file processing unit that, when accessing a file, controls access to the file based on the extent area designation entry and the extent area extent information entry when the entry group corresponding to the file includes the extent area designation entry, and
a normal file processing unit that, when accessing a file, controls access to the file based on the file allocation table when the entry group corresponding to the file includes no extent area designation entry.

12. A file management method using a nonvolatile memory storing file data, the method comprising:
managing a file using an extent information entry, a file allocation table, and an entry group, the extent information entry managing the file data in units of fixed-length blocks and including, as management information for a continuous area including one or more fixed-length blocks, information for identifying at least a position and a size of the continuous area, the file allocation table managing information indicating a link between the fixed-length blocks, and the entry group being generated for a single file and internally including one or more fixed-length entries storing management information including information about a name and a size of the file and information about a checksum of the one or more fixed-length entries,
wherein the entry group includes an extent area designation entry including information for identifying a position and a size of the extent area,
wherein the extent information entry is stored into an area that is external to the entry group and is included in an extent area formed by a fixed-length block,
wherein when accessing a file, a control processing to access to the file based on the extent area designation entry and the extent area extent information entry is performed when the entry group corresponding to the file includes the extent area designation entry, and when accessing a file, a controls processing to access to the file based on the file allocation table is performed when the entry group corresponding to the file includes no extent area designation entry.

13. A non-transitory computer-readable storage medium storing a program enabling a computer to implement the file management method according to claim 12.

* * * * *